US012783908B2

(12) United States Patent
Sharma et al.

(10) Patent No.: US 12,783,908 B2
(45) Date of Patent: Nov. 3, 2026

(54) ATTENTION-BASED CLASSIFIER MACHINE LEARNING MODELS USING DUAL-POSITIONAL-MODE SEGMENT EMBEDDINGS

(71) Applicant: Optum, Inc., Minnetonka, MN (US)

(72) Inventors: Kartik B. Sharma, Nagpur (IN); Aravind Brahmadevara, Hyderabad (IN)

(73) Assignee: Optum, Inc., Minnetonka, MN (US)

( * ) Notice: Subject to any disclaimer, the term of this patent is extended or adjusted under 35 U.S.C. 154(b) by 1028 days.

(21) Appl. No.: 17/821,942

(22) Filed: Aug. 24, 2022

(65) Prior Publication Data

US 2024/0070479 A1 Feb. 29, 2024

(51) Int. Cl.
*G06N 5/022* (2023.01)

(52) U.S. Cl.
CPC .................................... *G06N 5/022* (2013.01)

(58) Field of Classification Search
CPC .......... G06N 5/022; G06N 3/044; G06N 3/08; G06N 5/01; G06N 20/00; G06N 3/045
See application file for complete search history.

(56) References Cited

U.S. PATENT DOCUMENTS

| | | | |
|---|---|---|---|
| 5,909,570 | A | 6/1999 | Webber |
| 6,418,400 | B1 | 7/2002 | Webber |
| 6,581,062 | B1 | 6/2003 | Draper et al. |

(Continued)

FOREIGN PATENT DOCUMENTS

| | | | |
|---|---|---|---|
| WO | 2020/089259 | A1 | 5/2020 |

OTHER PUBLICATIONS

Notice of Allowance and Fee(s) Due for U.S. Appl. No. 17/240,585, dated Mar. 3, 2023, (8 pages), United States Patent and Trademark Office, US.

(Continued)

*Primary Examiner* — Alexey Shmatov
*Assistant Examiner* — Kyu Hyung Han
(74) *Attorney, Agent, or Firm* — Alston & Bird LLP

(57) ABSTRACT

Various embodiments of the present invention use segment embeddings generated based at least in part on both intra-segment positional indicators for metadata labels within hierarchically-structured segments of a segment-ordered hierarchically-structured input data object as well as cross-segment position indicators for the noted hierarchically-structured segments. By increasing the amount of positional data supplied to an attention-based classifier machine learning model compared to existing single-positional-model approaches, various embodiments of the present invention enable increasing the amount of data patterns discovered by an attention-based classifier machine learning model during each training epoch, which increases training speed of the attention-based classifier machine learning model given a constant target predictive accuracy by using two levels/modes of positionality associated with a segment-ordered hierarchically-structured input data object to generate segment embeddings provided to an attention-based classifier machine learning model during training of the noted attention-based classifier machine learning model.

20 Claims, 9 Drawing Sheets

(56) References Cited

U.S. PATENT DOCUMENTS

| | | | | |
|---|---|---|---|---|
| 6,714,941 | B1 * | 3/2004 | Lerman ................. | G06F 16/953 707/999.102 |
| 7,607,137 | B2 | 10/2009 | Hauser et al. | |
| 8,769,480 | B1 | 7/2014 | Wagner et al. | |
| 9,390,084 | B2 | 7/2016 | Mitchell et al. | |
| 11,281,863 | B2 | 3/2022 | Keskar et al. | |
| 2008/0168109 | A1 | 7/2008 | Gaurav et al. | |
| 2010/0250497 | A1 * | 9/2010 | Redlich .................. | G06Q 10/06 707/661 |
| 2012/0173475 | A1 | 7/2012 | Ash et al. | |
| 2017/0228821 | A1 | 8/2017 | Reimer | |
| 2018/0314956 | A1 | 11/2018 | Biswas et al. | |
| 2019/0163679 | A1 | 5/2019 | Srinivasa et al. | |
| 2019/0377807 | A1 | 12/2019 | Dean et al. | |
| 2020/0117737 | A1 | 4/2020 | Gopalakrishnan et al. | |
| 2021/0319288 | A1 | 10/2021 | Wagner et al. | |
| 2021/0350915 | A1 | 11/2021 | Letinic | |
| 2021/0383067 | A1 * | 12/2021 | Reisswig .............. | G06F 16/355 |
| 2022/0093088 | A1 | 3/2022 | Rangarajan Sridhar et al. | |
| 2022/0107852 | A1 | 4/2022 | Kulkarni et al. | |
| 2022/0342900 | A1 | 10/2022 | Basu et al. | |

OTHER PUBLICATIONS

Ainslie, Joshua et al. “ETC: Encoding Long and Structured Inputs in Transformers,” arXiv preprint arXiv:2004.084835v5 [cs.LG] Oct. 27, 2020, (17 pages). Available online: <URL: https://arxiv.org/pdf/2004.08483.pdf>.

Gururangan, Suchin et al. “Don’t Stop Pretraining: Adapt Language Models to Domains and Tasks, ” arXiv preprint arXiv:2004.10964v1 [cs.CL] Apr. 23, 2020, (19 pages).

Hu, Jiawei. “An Overview for Text Representations in NLP,” Towards Data Science, Mar. 4, 2020, (21 pages), [Retrieved from the Internet Sep. 30, 2022] <URL: https://towardsdatascience.com/an-overview-for-text-representations-in-nlp-311253730af1>.

Michaeko. “X12 Reference Identification Qualifier EDI Blog,” EDI Academy, Jul. 30, 2019, (46 pages), [Retrieved from the Internet Sep. 30, 2022] <URL: https://ediacademy.com/blog/x12-reference-identification-qualifier/>.

NonFinal Office Action for U.S. Appl. No. 17/240,585, dated Sep. 23, 2022, (12 pages), United States Patent and Trademark Office, US.

Shaw, Peter et al. “Self-Attention with Relative Position Representations,” arXiv preprint arXiv:1803.02155v2 [cs.CL] Apr. 12, 2018, (5 pages), available online: <URL: https://arxiv.org/pdf/1803.02155.pdf>.

Wang, Lidong. “Heterogeneous Data and Big Data Analytics,” Automatic Control and Information Sciences, vol. 3, No. 1, pp. 8-15, Oct. 2017, DOI: 10.12691/acis-3-1-3.

Wei, Jungiu et al. “NEZHA: Neural Contextualized Representation For Chinese Language Understanding,” arXiv preprint arXiv: 1909.00204v3 [cs.CL] Nov. 19, 2021, (9 pages), available online: < URL: https://arxiv.org/pdf/1909.00204.pdf>.

* cited by examiner

ATTENTION-BASED CLASSIFIER MACHINE LEARNING MODELS USING DUAL-POSITIONAL-MODE SEGMENT EMBEDDINGS

BACKGROUND

Various embodiments of the present invention address technical challenges related to performing attention-based machine learning operations on highly structured data and provide solutions to address the efficiency and reliability shortcomings of existing attention-based classifier machine learning structures.

BRIEF SUMMARY

In general, various embodiments of the present invention provide methods, apparatus, systems, computing devices, computing entities, and/or the like for performing attention-based machine learning operations on highly structured data. Various embodiments of the present invention use segment embeddings generated based at least in part on both intra-segment positional indicators for metadata labels within hierarchically-structured segments of a segment-ordered hierarchically-structured input data object as well as cross-segment position indicators for the noted hierarchically-structured segments. By increasing the amount of positional data supplied to an attention-based classifier machine learning model compared to existing single-positional-model approaches, various embodiments of the present invention enable increasing the amount of data patterns discovered by an attention-based classifier machine learning model during each training epoch, which increases training speed of the attention-based classifier machine learning model given a constant target predictive accuracy by using two levels/modes of positionality associated with a segment-ordered hierarchically-structured input data object to generate segment embeddings provided to an attention-based classifier machine learning model during training of the noted model.

In accordance with one aspect, a method is provided. In one embodiment, the method comprises: identifying a segment-ordered hierarchically-structured input data object, wherein: (i) the segment-ordered hierarchically-structured input data object comprises an ordered segment sequence of S hierarchically-structured segments, (ii) each hierarchically-structured segment comprises a metadata label set that is selected from a metadata label schema comprising L metadata labels, (iii) each metadata label set for a particular structured segment comprises a primary metadata label and one or more secondary metadata labels, and (iv) the S hierarchically-structured segments comprise a reference hierarchically-structured segment; for each hierarchically-structured segment, generating a dual-positional-mode segment embedding that describes: (i) for each metadata label in the metadata label set for the hierarchically-structured segment, an intra-segment positional indicator for the metadata label with respect to the hierarchically-structured segment, (ii) the primary metadata label for the hierarchically-structured segment, and (iii) a cross-segment referential distance positional indicator for the hierarchically-structured segment with respect to the reference hierarchically-structured segment; for each hierarchically-structured segment, generating, using an attention-based classifier machine learning model, and based at least in part on each dual-positional-mode segment embedding, a task-specific segment score with respect to a segment inference task; generating a predicted target segment based at least in part on each task-specific segment score; and performing one or more prediction-based actions based at least in part on the predicted target segment.

In accordance with another aspect, an apparatus comprising at least one processor and at least one memory including computer program code is provided. In one embodiment, the at least one memory and the computer program code may be configured to, with the processor, cause the apparatus to: identify a segment-ordered hierarchically-structured input data object, wherein: (i) the segment-ordered hierarchically-structured input data object comprises an ordered segment sequence of S hierarchically-structured segments, (ii) each hierarchically-structured segment comprises a metadata label set that is selected from a metadata label schema comprising L metadata labels, (iii) each metadata label set for a particular structured segment comprises a primary metadata label and one or more secondary metadata labels, and (iv) the S hierarchically-structured segments comprise a reference hierarchically-structured segment; for each hierarchically-structured segment, generate a dual-positional-mode segment embedding that describes: (i) for each metadata label in the metadata label set for the hierarchically-structured segment, an intra-segment positional indicator for the metadata label with respect to the hierarchically-structured segment, (ii) the primary metadata label for the hierarchically-structured segment, and (iii) a cross-segment referential distance positional indicator for the hierarchically-structured segment with respect to the reference hierarchically-structured segment; for each hierarchically-structured segment, generate, using an attention-based classifier machine learning model, and based at least in part on each dual-positional-mode segment embedding, a task-specific segment score with respect to a segment inference task; generate a predicted target segment based at least in part on each task-specific segment score; and perform one or more prediction-based actions based at least in part on the predicted target segment.

In accordance with yet another aspect, a computer program product is provided. The computer program product may comprise at least one computer-readable storage medium having computer-readable program code portions stored therein, the computer-readable program code portions comprising executable portions configured to: identify a segment-ordered hierarchically-structured input data object, wherein: (i) the segment-ordered hierarchically-structured input data object comprises an ordered segment sequence of S hierarchically-structured segments, (ii) each hierarchically-structured segment comprises a metadata label set that is selected from a metadata label schema comprising L metadata labels, (iii) each metadata label set for a particular structured segment comprises a primary metadata label and one or more secondary metadata labels, and (iv) the S hierarchically-structured segments comprise a reference hierarchically-structured segment; for each hierarchically-structured segment, generate a dual-positional-mode segment embedding that describes: (i) for each metadata label in the metadata label set for the hierarchically-structured segment, an intra-segment positional indicator for the metadata label with respect to the hierarchically-structured segment, (ii) the primary metadata label for the hierarchically-structured segment, and (iii) a cross-segment referential distance positional indicator for the hierarchically-structured segment with respect to the reference hierarchically-structured segment; for each hierarchically-structured segment, generate, using an attention-based classifier machine learning model, and based at least in part on each dual-positional-mode segment embedding, a task-specific segment score with respect to a segment inference task; generate a predicted target segment based at least in part on each task-specific segment score; and perform one or more prediction-based actions based at least in part on the predicted target segment.

BRIEF DESCRIPTION OF THE DRAWINGS

Figure 1:
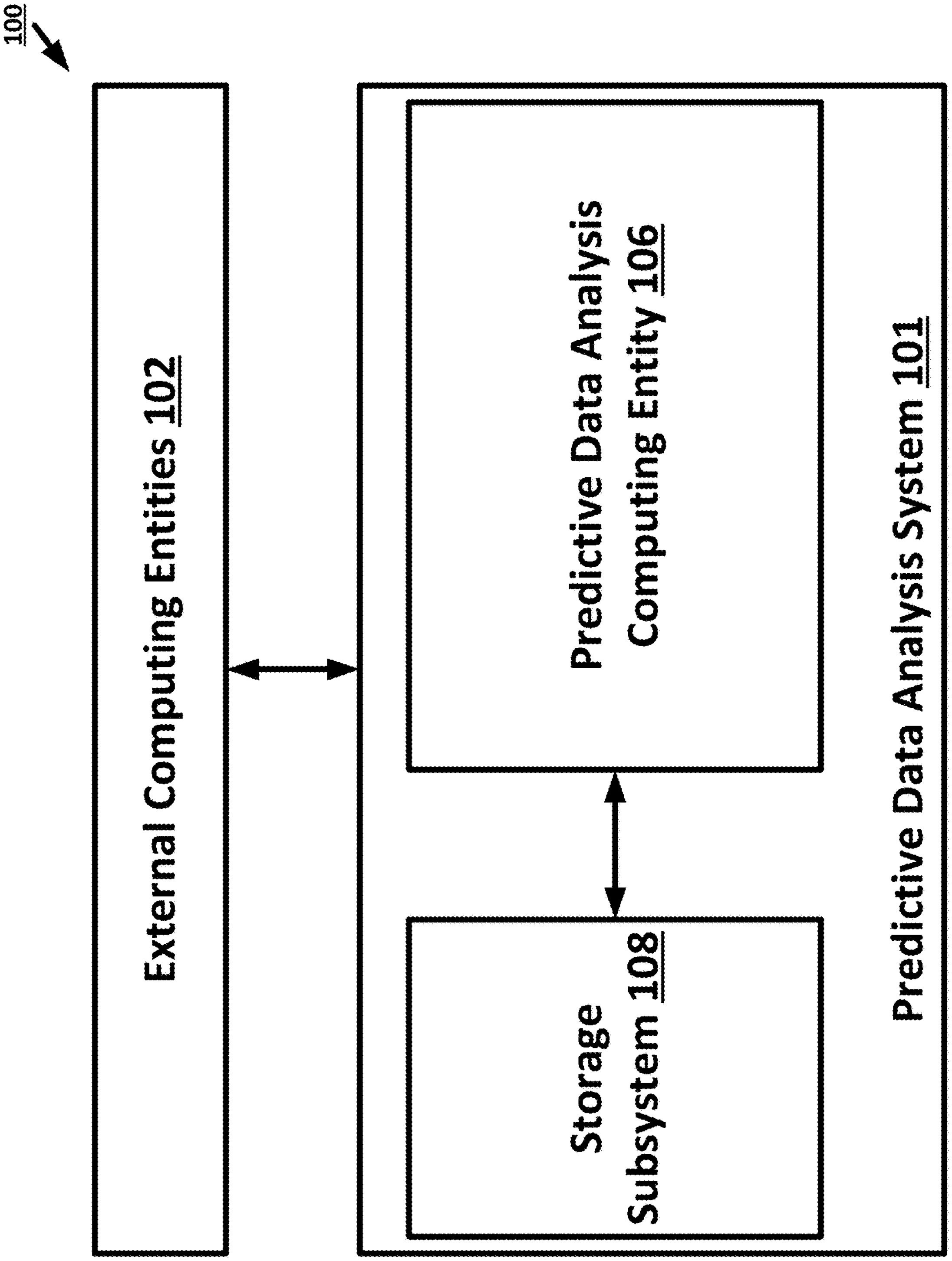

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
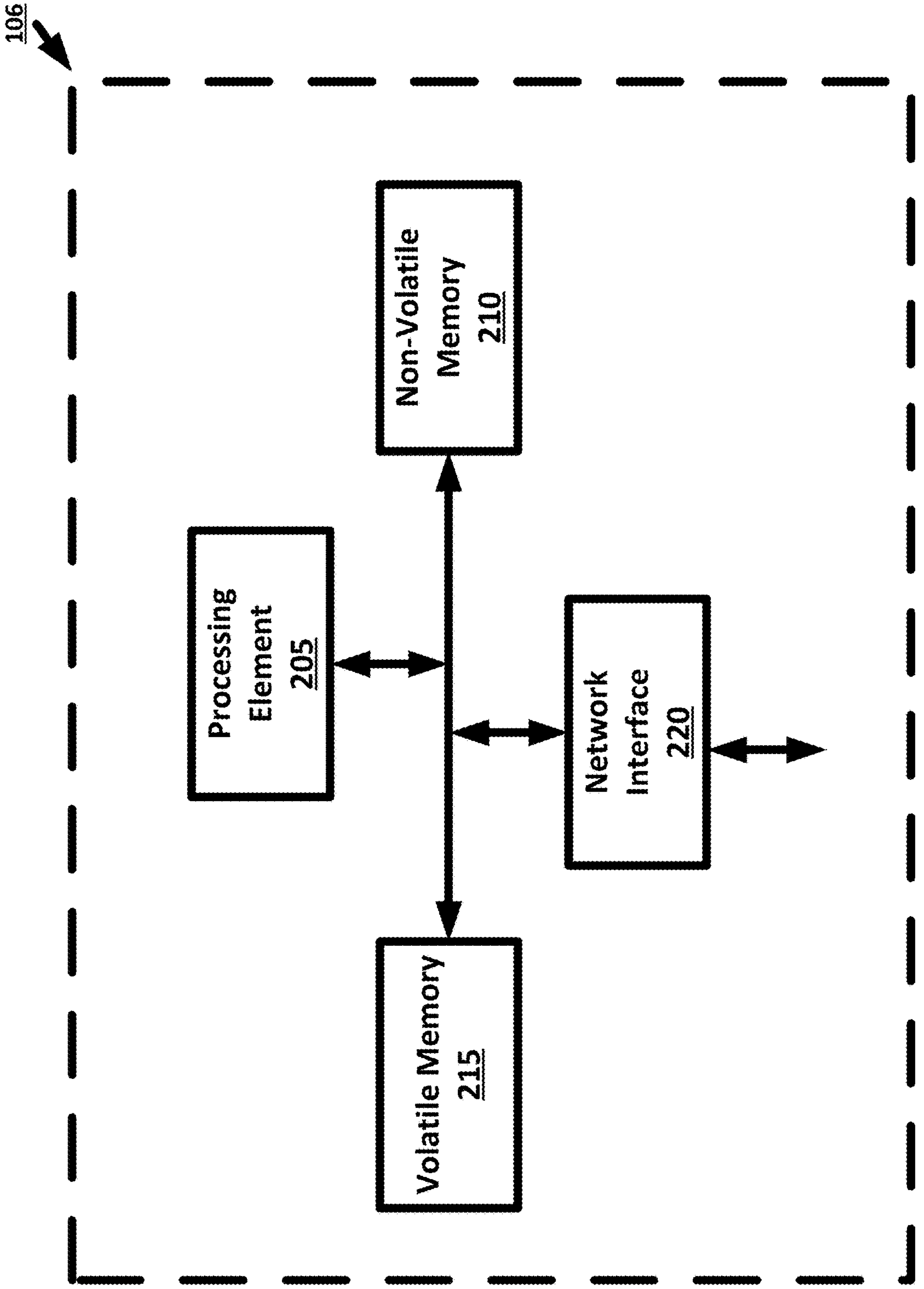

FIG. 2 provides an example predictive data analysis computing entity in accordance with some embodiments discussed herein.

Figure 3:
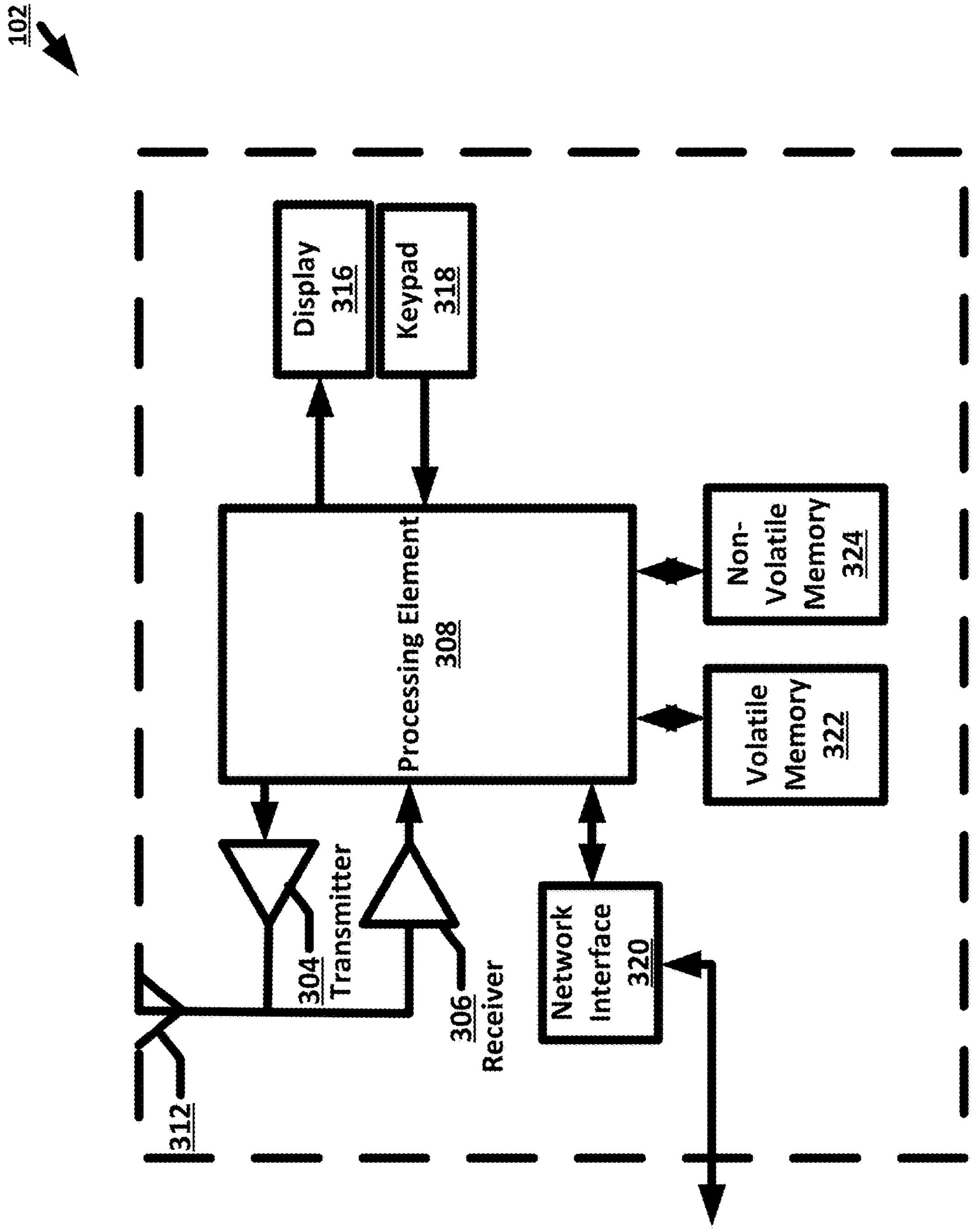

FIG. 3 provides an example client computing entity in accordance with some embodiments discussed herein.

Figure 4:
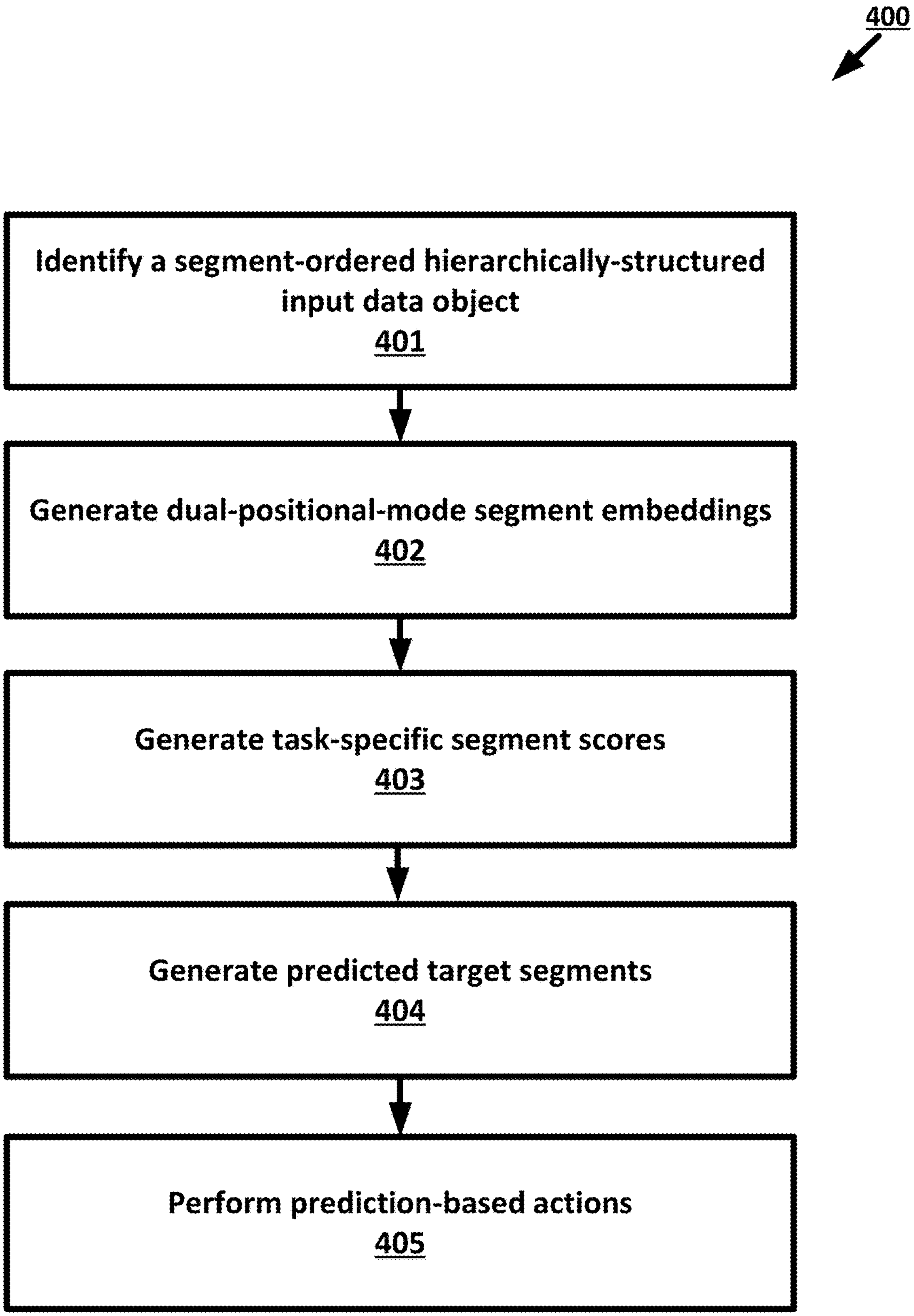

FIG. 4 is a flowchart diagram of an example process for generating predicted target segments for a set of segment inference tasks in accordance with some embodiments discussed herein.

Figure 5:
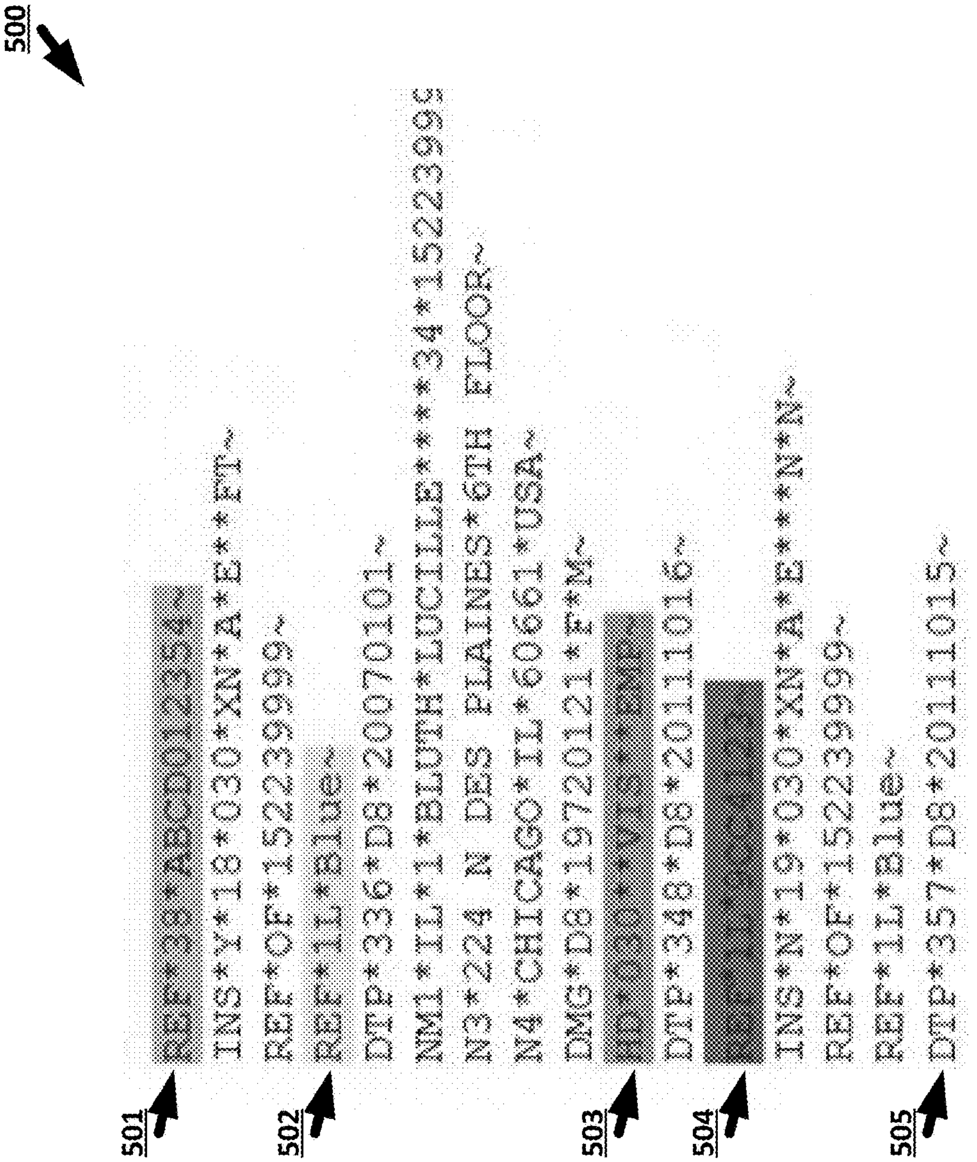

FIG. 5 provides an operational example of a segment-ordered hierarchically-structured input data object in accordance with some embodiments discussed herein.

Figure 6:
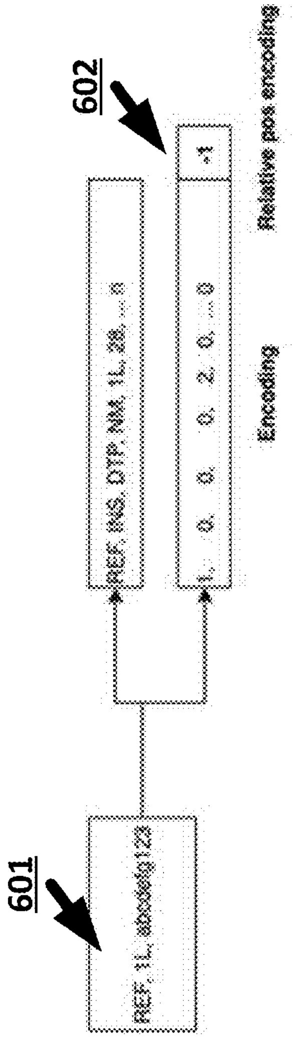

FIG. 6 provides an operational example of a dual-positional-mode segment embedding for a hierarchically-structured segment of a segment-ordered hierarchically-structured input data object in accordance with some embodiments discussed herein.

Figure 7:
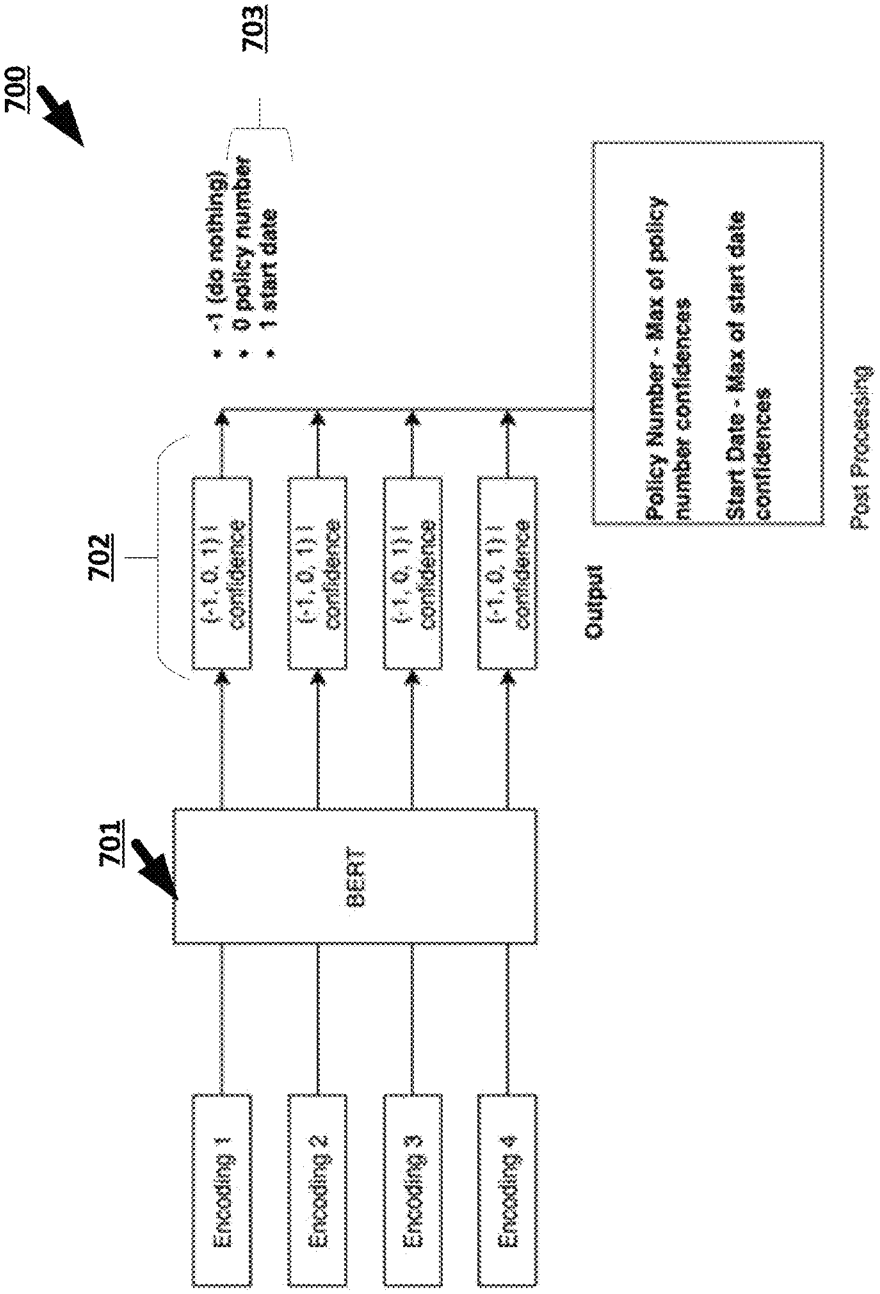

FIG. 7 provides an operational example of an attention-based classifier machine learning model in accordance with some embodiments discussed herein.

Figure 8:
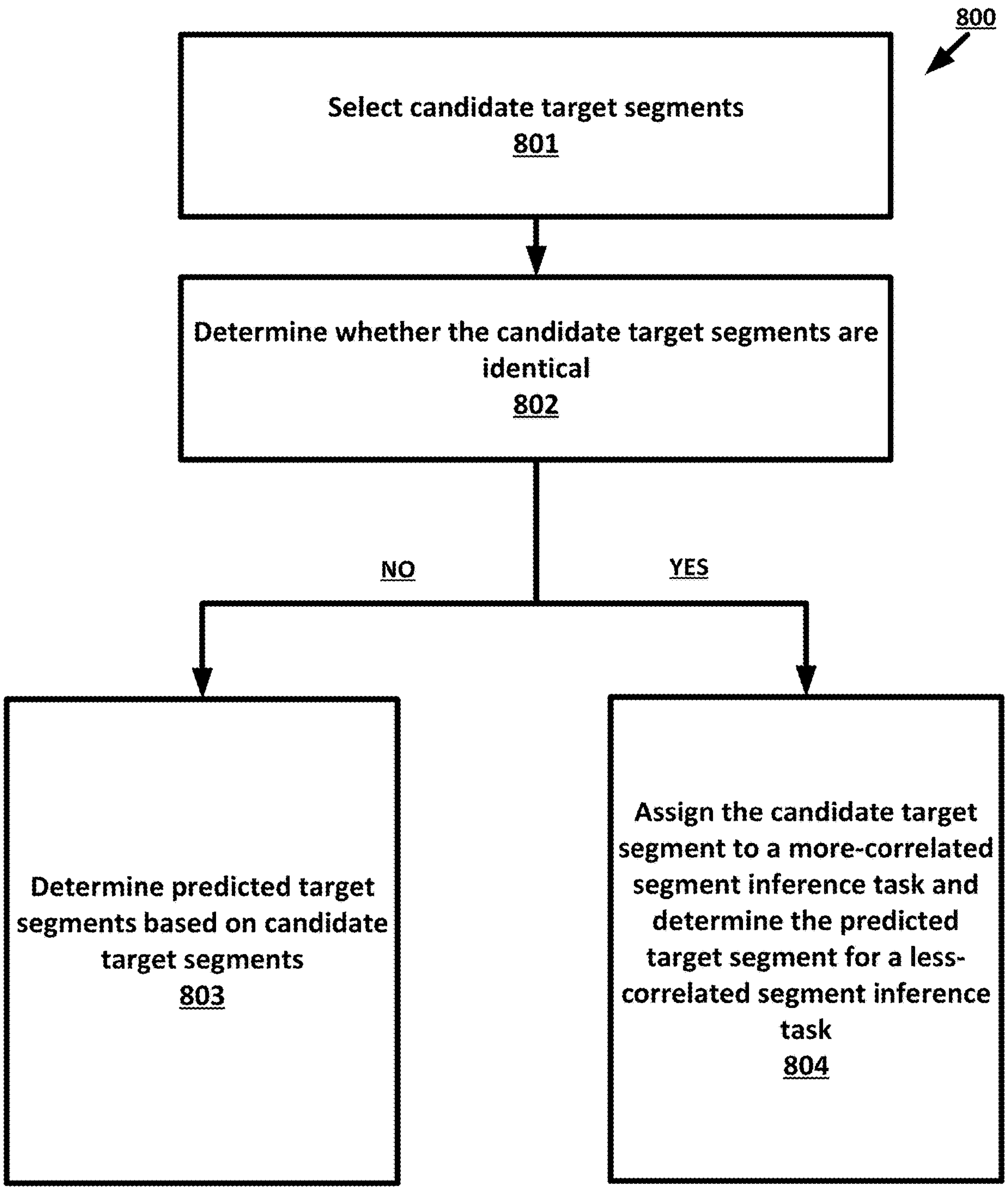

FIG. 8 is a flowchart diagram of an example process for generating the predicted target segment for a first segment inference task of two segment inference in accordance with some embodiments discussed herein.

Figure 9:
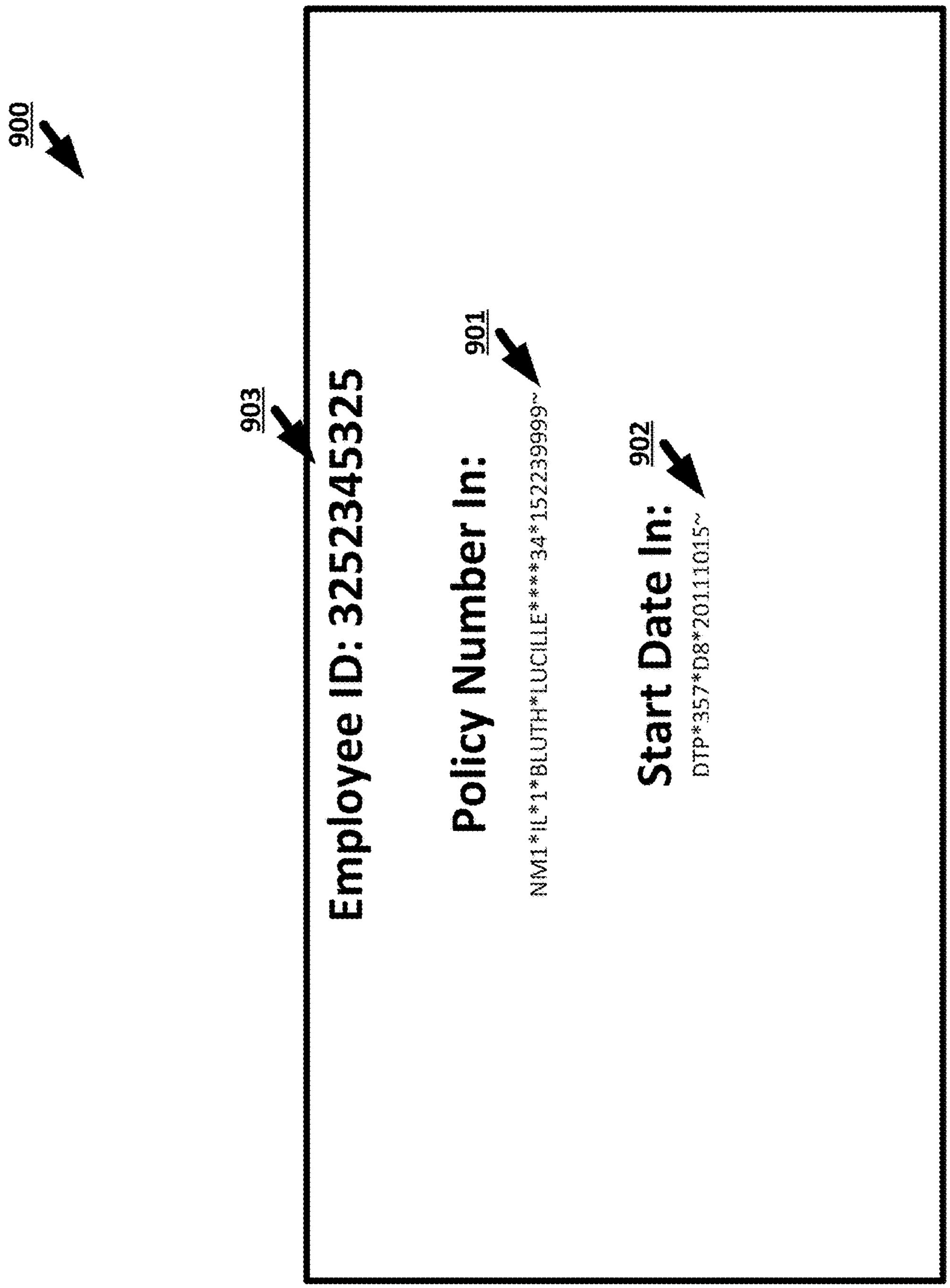

FIG. 9 provides an operational example of a prediction output user interface in accordance with some embodiments discussed herein.

DETAILED DESCRIPTION

Various embodiments of the present invention now will be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention make important technical contributions to improving computational efficiency and operational reliability of training attention-based classifier machine learning models. As described herein, in some embodiments, a dual-positional-mode segment embedding for a hierarchically-structured segment of a segment-ordered hierarchically-structured input data object is generated to reflect both a cross-segment positional indicator for the hierarchically-structured segment within a segment ordering of the segment-ordered hierarchically-structured input data object as well as intra-segment positional indicators for metadata labels of the hierarchically-structured segment within a per-segment ordering associated with the hierarchically-structured segment. This means that, by using two levels/modes of positionality associated with the segment-ordered hierarchically-structured input data object, the dual-positional-mode segment embedding is able to reflect two independent types of positional data associated with two independent positional embedding modes (i.e., an intra-segment positional embedding mode and a cross-segment positional embedding mode). This approach increases the amount of positional data supplied to an attention-based classifier machine learning model compared to existing single-positional-model approaches that supply cross-token positional embeddings as part of initial token embeddings. By increasing the amount of positional data supplied to an attention-based classifier machine learning model compared to existing single-positional-model approaches, various embodiments of the present invention enable increasing the amount of data patterns discovered by an attention-based classifier machine learning model during each training epoch, which increases training speed of the attention-based classifier machine learning model given a constant target predictive accuracy. Accordingly, by using two levels/modes of positionality associated with a segment-ordered hierarchically-structured input data object to generate segment embeddings provided to an attention-based classifier machine learning model during training of the noted model, various embodiments of the present invention make important technical contributions to improving computational efficiency and operational reliability of the resulting attention-based classifier machine learning models.

In some embodiments, by using various techniques described herein, a proposed system can use segment embeddings generated based at least in part on both intra-segment positional indicators for metadata labels within hierarchically-structured segments of a segment-ordered hierarchically-structured input data object as well as cross-segment position indicators for the noted hierarchically-structured segments to provide an attention-based classifier machine learning model with both intra-token and cross-token positional indicator data, an approach which increases training speed of the attention-based classifier machine learning model given a constant target predictive accuracy.

An exemplary application of various embodiments of the present invention relates to machine learning techniques for Electronic Data Interchange (EDI) data processing. In some embodiments, a machine learning framework comprising a bidirectional attention-based encoder model and a classification model, where: (i) the bidirectional attention-based encoder is configured to process aggregate vectors for a set of Electronic Data Interchange (EDI) lines/segments to generate an encoded representation for each EDI line/segment, (ii) the classification model is configured to process encoded representations for the EDI lines/segments to generate line/segment classifications, and (iii) each aggregate vector for a particular EDI line/segment is generated based at least in part on a first vector that describes occurrences of a set of EDI metadata header tokens within the particular EDI line/segment as well as the relative position of the particular EDI line/segment with respect to a reference EDI line/segment and a second vector that describes frequencies of the set of EDI metadata header tokens within the particular EDI line/segment.

Electronic Data Interchange (EDI) is the computer-to-computer exchange of business documents in a standard electronic format between business partners. EDI allows entities within the health care system to exchange medical, billing, and other information to process transactions in a more expedient and cost-effective manner. Various embodiments of the present invention relate to improvement in data integration between heterogeneous systems, more particularly to enable mapping a sequential semi-structured data set to a structured/semi-structured data set. Aspects of the EDI Mapping concepts encode each line/segment of EDI data into two vectors: a first vector that has the size vocabulary+1, where each non-final vector value corresponds to an EDI metadata header token and describes whether the line/segment includes the EDI metadata header token, and where the final vector value describes the position of the line/segment with respect to a reference line/segment (e.g., the health coverage or HD line/segment), and a second vector that has the size vocabulary, where each non-final vector corresponds to an EDI metadata header token and describes a position of the EDI metadata header token within the line segment. Once the two vectors for a line/segment are generated, the two are merged into an aggregate vector. Then, the aggregate vectors for the line/segments of an EDI data object are processed using a bidirectional attention-based encoder (e.g., a Bidirectional Encoder Representations from Transformers (BERT)) model to generate an encoding for each line/segment. In some embodiments, the bidirectional attention-based encoder is trained as part of a classification model that is generated based at least in part on per-line/segment labels (e.g., (e.g., where a line/segment is assigned a label of 1 if the line corresponds to the coverage date, else it is labelled as 0 if the line is in no way related to coverage date).

In some embodiments, a proposed machine learning framework comprises a bidirectional attention-based encoder model and a classification model, where: (i) the bidirectional attention-based encoder is configured to process aggregate vectors for a set of EDI lines/segments to generate an encoded representation for each EDI line/segment, (ii) the classification model is configured to process encoded representations for the EDI lines/segments to generate line/segment classifications, and (iii) each aggregate vector for a particular EDI line/segment is generated based at least in part on a first vector that describes occurrences of a set of EDI metadata header tokens within the particular EDI line/segment as well as the relative position of the particular EDI line/segment with respect to a reference EDI line/segment and a second vector that describes frequencies of the set of EDI metadata header tokens within the particular EDI line/segment.

Various embodiments of the present invention make important technical contributions to improving resource-usage efficiency of post-prediction systems for a particular segment inference ask by using predicted target segments to set the number of allowed computing entities used by the noted post-prediction systems. For example, in some embodiments, a predictive data analysis computing entity determines D target segment indicators for D hierarchically-structured segments based at least in part on the D task-specific segment scores for the D hierarchically-structured segments. Then, the count of hierarchically-structured segments that are associated with an affirmative target segment indicator, along with a resource utilization ratio for each hierarchically-structured segment, can be used to predict a predicted number of computing entities needed to perform post-prediction processing operations (e.g., automated investigation operations) with respect to the D hierarchically-structured segments. For example, in some embodiments, the number of computing entities needed to perform post-prediction processing operations (e.g., automated investigation operations) with respect to D hierarchically-structured segments can be determined based at least in part on the output of the equation: R=

$$\text{ceil}\left(\sum_{k}^{k=K} ur_k\right),$$

where R is the predicted number of computing entities needed to perform post-prediction processing operations with respect to the D hierarchically-structured segment, ceil(.) is a ceiling function that returns the closest integer that is greater than or equal to the value provided as the input parameter of the ceiling function, k is an index variable that iterates over K hierarchically-structured segments among the D hierarchically-structured segments that are associated with affirmative classifications, and $ur_k$ is the estimated resource utilization ratio for a kth hierarchically-structured segment that may be determined based at least in part on a count of utterances/tokens/words in the kth hierarchically-structured segment. In some embodiments, once R is generated, the predictive data analysis computing entity can use R to perform operational load balancing for a server system that is configured to perform post-prediction processing operations (e.g., automated investigation operations) with respect to D hierarchically-structured segments. This may be done by allocating computing entities to the post-prediction processing operations if the number of currently allocated computing entities is below R, and deallocating currently allocated computing entities if the number of currently allocated computing entities is above R.

II. DEFINITIONS

The term "segment-ordered hierarchically-structured input data object" may refer to a data construct that describes a set of S hierarchically-structured segments, where at least one hierarchically-segment of the S hierarchically-structured segments of the segment-ordered hierarchically-structured input data object includes a data value set and a metadata label set, and where the metadata label set for a particular hierarchically-structured segment comprises a primary metadata label and one or more metadata labels. An example of a segment-ordered hierarchically-structured input data object is an input data object that describes data structured in accordance with an Electronic Data Interchange (EDI) standard, such as in accordance with the X12 EDI standard, the Context Inspired Component Architecture (CICA) EDI standard, the United Nations/Electronic Data Interchange for Administration, Commerce and Transport (UN/EDIFACT) EDI standard, the Odette File Transfer Protocol (OFTP) EDI standard, and/or the like. In some embodiments, the segment-ordered hierarchically-structured input data object is an ordered sequence of S hierarchically-structures segments, where the ordered sequence (referred to herein as an ordered segment sequence) defines an initial hierarchically-structured segment of the S hierarchically-structures segments, a final hierarchically-structured segment of the S hierarchically-structures segments, as well as: (i) for each non-initial hierarchically-structured segment of the S hierarchically-structures segments, the preceding hierarchically-structured segment of the S hierarchically-structures segments, and (ii) for each non-final hierarchically-structured segment of the S hierarchically-structures segments, the following hierarchically-structured segment of the S hierarchically-structures segments. In this way, the ordered segment sequence enables generating, for each segment pair that comprises a first hierarchically-structured segment and a second hierarchically-structured segment of the S hierarchically-structures segments, a cross-segment distance positional indicator that describes: (i) whether the second hierarchically-structured segment comes before or after the first hierarchically-structured segment, and (ii) how many hierarchically-structured segments are positioned between the first hierarchically-structured segment and the hierarchically-structured segment in accordance with the ordered segment sequence of the S hierarchically-structured segments.

The term "hierarchically-structured segment" may refer to a data construct that describes a defined segment of a segment-ordered hierarchically-structured input data object that includes a data value set and a metadata label set, and where the metadata label set for a particular hierarchically-structured segment comprises a primary metadata label and one or more metadata labels. In some embodiments, each hierarchically-structured segment of a segment-ordered hierarchically-structured input data object is itself associated with a set of ordered segment tokens associated with a per-segment token order. In some of the noted embodiments, the ordered segment tokens of a hierarchically-structured segment comprise a data value set comprising a set of data values and a metadata label set. For example, an exemplary hierarchically-structured segment may be "REF*OF*152239999~", may include the following segment tokens {REF, OF, 152239999}, and may be associated with the following per-segment token order {REF→OF→152239999}. In this example, "REF" and "OF" may be metadata labels of the exemplary hierarchically-structured segment, while "152239999" may be the sole data value of the exemplary hierarchically-structured segment. In some embodiments, because the per-segment token order defines an ordering of the segment tokens of a hierarchically-structured segment, and because the segment tokens of a hierarchically-structured segment include the metadata labels of the hierarchically-structured segment, the per-segment taken order for the hierarchically-structured segment by definition defines an ordering of metadata labels of the hierarchically-structured segment that is referred to herein as a per-segment metadata label order for the hierarchically-structured segment. For example, the exemplary hierarchically-structured segment "REF*OF*152239999~" may be associated with the following per-segment metadata label order {REF→OF}.

The term "primary metadata label" may refer to a data construct that describes a metadata label of a corresponding hierarchically-structured segment that is positioned to indicate that the primary metadata label has semantic significance for the entirety of the segment tokens in the hierarchically-structured segment. In some embodiments, when the metadata label set for the hierarchically-structured segment is associated with a per-segment metadata label order that defines an ordering of the metadata labels in the noted metadata label set, the initial metadata label in the noted metadata label set as defined in accordance with the per-segment metadata label order is selected as the primary metadata label for the noted hierarchically-structured segment. For example, if an exemplary hierarchically-structured segment is associated with the per-segment metadata label order {REF→OF}, then the metadata label "REF" may be selected as the primary metadata label for the noted exemplary hierarchically-structured segment.

The term "secondary metadata label" may refer to a data construct that describes a metadata label of a corresponding hierarchically-structured segment that is positioned to indicate that the primary metadata label has semantic significance for a non-holistic segment of the segment tokens in the hierarchically-structured segment. In some embodiments, when the metadata label set for the hierarchically-structured segment is associated with a per-segment metadata label order that defines an ordering of the metadata labels in the noted metadata label set, non-initial metadata labels in the noted metadata label set as defined in accordance with the per-segment metadata label order are selected as the secondary metadata labels for the noted hierarchically-structured segment. For example, if an exemplary hierarchically-structured segment is associated with the per-segment metadata label order {REF→OF}, then the metadata label "OF" may be selected as the sole secondary metadata label for the noted exemplary hierarchically-structured segment. As another example, if an exemplary hierarchically-structured segment is associated with the per-segment metadata label order {INS→Y→XN→A→E→FT}, then the metadata labels "Y", "XN", "XN", "A", "E", and "FT" may be selected as secondary metadata labels for the noted exemplary hierarchically-structured segment.

The term "metadata label schema" may refer to a data construct that describes an underlying structural scheme/standard that defines a metadata label schema. In some embodiments, a metadata label schema is a set of all available/defined metadata labels defined by a structural scheme/standard that may be selected to be included in hierarchically-structured segments of various segment-ordered hierarchically-structured input data objects defined in accordance with the structural scheme/standard. An example of a metadata label schema is the set of all metadata labels (aka. line segment identifier labels) defined by an EDI standard. For example, the metadata label schema associated with the X12 EDI standard can be accessed at EDI Academy, *X12 Reference Identification Qualifier* (Published on Jul. 30, 2019), available online at https://ediacademy.com/blog/x12-reference-identification-qualifier. In some embodiments, a metadata label schema defines L defined/available metadata labels, where the metadata label set for each particular hierarchically-segment is then a selected subset of the L defined/available metadata labels, such as selected subset of all of the line segment identifier labels defined by an EDI standard. In some embodiments, the metadata label schema for a corpus of segment-ordered hierarchically-structured input data object (e.g., a corpus of EDI X12 files) is generated by identifying the metadata labels occurring within the corpus using a frequency-based keyword extraction routine, such as a frequency-based keyword extraction routine that uses one or more statistical measures such as an entropy measure, a Gini index measure, and/or the like.

The term "dual-positional-mode segment embedding" may refer to a data construct that describes a fixed-size representation of a corresponding hierarchically-structured segment in a particular segment-ordered hierarchically-structured input data object that describes: (i) the primary metadata label for the corresponding hierarchically-structured segment, (ii) for each metadata label of the corresponding hierarchically-structured segment, an intra-segment positional indicator for the metadata label within the corresponding hierarchically-structured segment, and (iii) a cross-segment distance positional indicator for the corresponding hierarchically-structured segment within the particular segment-ordered hierarchically-structured input data object. For example, consider a segment-ordered hierarchically-structured input data object that is associated with an ordered segment sequence in which the hierarchically-structured segment "DTP*357*D8*20111015~" is the sixteenth hierarchically-structured segment while the hierarchically-structured segment "HD*030VISEMP~" is the tenth hierarchically-structured segment. In some embodiments, given the noted example, the dual-positional-mode segment embedding for the hierarchically-structured segment "DTP*357*D8*20111015~" may describe that: (i) the primary metadata label for the hierarchically-structured segment "DTP*357*D8*20111015~" is the metadata label "DTP", (ii) the metadata label "DTP" is the first-occurring metadata label of the hierarchically-structured segment "DTP*357*D8*20111015~" while the metadata label "D8" is the second-occurring metadata label of the hierarchically-structured segment "DTP*357*D8*20111015~", and (iii) the hierarchically-structured segment "DTP*357*D8*20111015~" has a cross-segment distance positional indicator of +6 with respect to the hierarchically-structured segment "HD*030VISEMP~". In some other embodiments, given the noted example, the dual-positional-mode segment embedding for the hierarchically-structured segment "DTP*357*D8*20111015~" may describe that: (i) the primary metadata label for the hierarchically-structured segment "DTP*357*D8*20111015~" is the metadata label "DTP", (ii) the metadata label "DTP" is the first-occurring segment token of the hierarchically-structured segment "DTP*357*D8*20111015~" while the metadata label "D8" is the third-occurring segment token of the hierarchically-structured segment "DTP*357*D8*20111015~", and (iii) the hierarchically-structured segment "DTP*357*D8*20111015~" has a cross-segment distance positional indicator of +6 with respect to the hierarchically-structured segment "HD*030VISEMP~".

The term "intra-segment positional indicator" may refer to a data construct that describes a relative position of the corresponding metadata label in an ordered sequence associated with the corresponding hierarchically-structured segment. For example, in some embodiments, the intra-segment positional indicator for a corresponding metadata label in a corresponding hierarchically-structured segment describes a relative position of the corresponding metadata label in the per-segment metadata label order for the corresponding hierarchically-structured segment. In an exemplary embodiment, using this approach, the intra-segment positional indicator for the metadata label "L2" in the hierarchically-structured segment "L1*V1*L2*V2" may be two, as the metadata label "L2" is the second-occurring metadata label in the hierarchically-structured segment "L1*V1*L2*V2". As another example, in some other embodiments, the intra-segment positional indicator for a corresponding metadata label in a corresponding hierarchically-structured segment describes a relative position of the corresponding metadata label in the per-segment token order for the corresponding hierarchically-structured segment. In an exemplary embodiment, using this approach, the intra-segment positional indicator for the metadata label "L2" in the hierarchically-structured segment "L1*V1*L2*V2" may be three, as the metadata label "L2" is the second-occurring segment token in the hierarchically-structured segment "L1*V1*L2*V2". In some embodiments, using this latter intra-segment positioning computation approach, data about not just relative ordering of metadata labels, but also relative positions of occurrences of data value tokens, are captured by the resulting dual-positional-mode segment embeddings.

The term "cross-segment referential distance positional indicator" may refer to a data construct that describes a cross-segment distance positional indicator between a corresponding hierarchically-structured segment and a reference hierarchically-structured segment. For example, consider a segment-ordered hierarchically-structured input data object that is associated with S=4 hierarchically-structured segments characterized by the ordered segment sequence $\{S1 \rightarrow S2 \rightarrow S3 \rightarrow S4\}$. In this example, if the reference hierarchically-structured segment is the hierarchically-structured segment S3, then: (i) the hierarchically-structured segment S1 may be associated with the cross-segment referential distance positional indicator −2, (ii) the hierarchically-structured segment S2 may be associated with the cross-segment referential distance positional indicator −1, (iii) the hierarchically-structured segment S3 may be associated with the cross-segment referential distance positional indicator 0, and (iv) the hierarchically-structured segment S4 may be associated with the cross-segment referential distance positional indicator +1.

The term "segment inference task" may refer to a data construct that describes a computational task whose successful completion/execution with respect to a particular segment-ordered hierarchically-structured input data object requires identifying, of the S hierarchically-structured segments of the particular segment-ordered hierarchically-structured input data object, which of the noted hierarchically-structured segments contain target data associated with the segment inference task. An exemplary of a segment inference task is a computational task that requires identifying which hierarchically-structured segment of a segment-ordered hierarchically-structured input data object contains health insurance policy number data associated with a corresponding employee. Another exemplary of a segment inference task is a computational task that requires identifying which hierarchically-structured segment of a segment-ordered hierarchically-structured input data object contains employment data associated with a corresponding employee.

The term "attention-based classifier machine learning model" may refer to a data construct that describes parameters, hyperparameters, and/or defined operations of a machine learning model that is configured to, given S hierarchically-structured segments of the segment-ordered hierarchically-structured input data object that are associated with S corresponding dual-positional-mode segment embeddings, and further given T segment inference tasks, generate S*T task-specific segment scores, where each task-specific segment score S*T task-specific segment scores: (i) is associated with a respective hierarchically-structured segment of the S hierarchically-structured segments and a respective segment inference task of the T segment inference tasks, and (ii) describes a predicted likelihood that the respective hierarchically-structured segment contains target data associated with the respective segment inference task. In some embodiments, an attention-based classifier model is configured to: (i) receive, as input data, S dual-positional-mode segment embeddings for S hierarchically-structured segments of a segment-ordered hierarchically-structured input data object, (ii) process the S dual-positional-mode segment embeddings using an attention-based encoding layer (e.g., a bidirectional attention-based encoding layer, such as a bidirectional attention-based encoding layer that uses a Bidirectional Encoder Representations from Transformers (BERT) model) in accordance with a computed attention weight for each segment pair comprising a pair of the S hierarchically-structured segments that describes the relative significance of the hierarchically-structured segments in the pair to each other to generate, for each hierarchically-structured segment, a respective attention-based segment embedding, (iii) for each hierarchically-structured segment, process the respective attention-based segment embedding for the hierarchically-structured segment using a latent classifier layer (e.g., a fully connected neural network architecture) to generate T task-specific segment scores for the hierarchically-structured segment with respect to T defined segment inference tasks. For example, consider a segment-ordered hierarchically-structured input data object that includes S=3 hierarchically-structured segments {S1, S2, S3} that are associated with corresponding dual-positional-mode segment embeddings {E1, E2, E3}. In some of the noted embodiments, given two segment inference tasks T1 and T2, the attention-based classifier model: (i) for S1, processes E1, E2, and E3 using the attention-based encoding layer and in accordance with attention weights for (S1, S1), (S1, S2), and (S1, S3) respectively to generate the attention-based segment embedding A1, (ii) for S2, processes E1, E2, and E3 using the attention-based encoding layer and in accordance with attention weights for (S2, S1), (S2, S2), and (S2, S3) respectively to generate the attention-based segment embedding A2, (iii) for S3, processes E1, E2, and E3 using the attention-based encoding layer and in accordance with attention weights for (S3, S1), (S3, S2), and (S3, S3) respectively to generate the attention-based segment embedding A3, (iv) for S1, processes A1 using the latent classifier layer to generate a two-sized output vector, where the first value of the two-sized output vector is a task-specific segment score describing a predicted/computed likelihood that S1 contains data associated with T1 and the second value of the two-sized output vector is task-specific segment score describing a predicted/computed likelihood that S2 contains data associated with T2, (v) for S2, processes A2 using the latent classifier layer to generate a two-sized output vector, where the first value of the two-sized output vector is a task-specific segment score describing a predicted/computed likelihood that S2 contains data associated with T1 and the second value of the two-sized output vector is task-specific segment score describing a predicted/computed likelihood that S2 contains data associated with T2, and (vi) for S3, processes A3 using the latent classifier layer to generate a two-sized output vector, where the first value of the two-sized output vector is a task-specific segment score describing a predicted/computed likelihood that S3 contains data associated with T1 and the second value of the two-sized output vector is task-specific segment score describing a predicted/computed likelihood that S3 contains data associated with T2.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating target EDI line segments that relate to particular subjects.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location-determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention make important technical contributions to improving computational efficiency and operational reliability of training attention-based classifier machine learning models. As described herein, in some embodiments, a dual-positional-mode segment embedding for a hierarchically-structured segment of a segment-ordered hierarchically-structured input data object is generated to reflect both a cross-segment positional indicator for the hierarchically-structured segment within a segment ordering of the segment-ordered hierarchically-structured input data object as well as intra-segment positional indicators for metadata labels of the hierarchically-structured segment within a per-segment ordering associated with the hierarchically-structured segment. This means that, by using two levels/modes of positionality associated with the segment-ordered hierarchically-structured input data object, the dual-positional-mode segment embedding is able to reflect two independent types of positional data associated with two independent positional embedding modes (i.e., an intra-segment positional embedding mode and a cross-segment positional embedding mode). This approach increases the amount of positional data supplied to an attention-based classifier machine learning model compared to existing single-positional-model approaches that supply cross-token positional embeddings as part of initial token embeddings. By increasing the amount of positional data supplied to an attention-based classifier machine learning model compared to existing single-positional-model approaches, various embodiments of the present invention enable increasing the amount of data patterns discovered by an attention-based classifier machine learning model during each training epoch, which increases training speed of the attention-based classifier machine learning model given a constant target predictive accuracy. Accordingly, by using two levels/modes of positionality associated with a segment-ordered hierarchically-structured input data object to generate segment embeddings provided to an attention-based classifier machine learning model during training of the noted model, various embodiments of the present invention make important technical contributions to improving computational efficiency and operational reliability of the resulting attention-based classifier machine learning models.

FIG. 4 is a flowchart diagram of an example process 400 for selecting T predicted target segments of a segment-ordered hierarchically-structured input data object with respect to T segment inference tasks. Via the various steps/operations of the process 400, the predictive data analysis computing entity 106 can use segment embeddings generated based at least in part on both intra-segment positional indicators for metadata labels within hierarchically-structured segments of a segment-ordered hierarchically-structured input data object as well as cross-segment position indicators for the noted hierarchically-structured segments to provide an attention-based classifier machine learning model with both intra-token and cross-token positional indicator data, an approach which increases training speed of the attention-based classifier machine learning model given a constant target predictive accuracy.

The process 400 begins at step/operation 401 when the predictive data analysis computing entity 106 identifies (e.g., receives, retrieves, generates, and/or the like) the segment-ordered hierarchically-structured input data object. In some embodiments, the segment-ordered hierarchically-structured input data object is a data object that includes a set of S hierarchically-structured segments, where at least one hierarchically-segment of the S hierarchically-structured segments of the segment-ordered hierarchically-structured input data object includes a data value set and a metadata label set, and where the metadata label set for a particular hierarchically-structured segment comprises a primary metadata label and one or more metadata labels. An example of a segment-ordered hierarchically-structured input data object is an input data object that describes data structured in accordance with an Electronic Data Interchange (EDI) standard, such as in accordance with the X12 EDI standard, the Context Inspired Component Architecture (CICA) EDI standard, the United Nations/Electronic Data Interchange for Administration, Commerce and Transport (UN/EDIFACT) EDI standard, the Odette File Transfer Protocol (OFTP) EDI standard, and/or the like.

In some embodiments, the segment-ordered hierarchically-structured input data object is an ordered sequence of S hierarchically-structures segments, where the ordered sequence (referred to herein as an ordered segment sequence) defines an initial hierarchically-structured segment of the S hierarchically-structures segments, a final hierarchically-structured segment of the S hierarchically-structures segments, as well as: (i) for each non-initial hierarchically-structured segment of the S hierarchically-structures segments, the preceding hierarchically-structured segment of the S hierarchically-structures segments, and (ii) for each non-final hierarchically-structured segment of the S hierarchically-structures segments, the following hierarchically-structured segment of the S hierarchically-structures segments. In this way, the ordered segment sequence enables generating, for each segment pair that comprises a first hierarchically-structured segment and a second hierarchically-structured segment of the S hierarchically-structures segments, a cross-segment distance positional indicator that describes: (i) whether the second hierarchically-structured segment comes before or after the first hierarchically-structured segment, and (ii) how many hierarchically-structured segments are positioned between the first hierarchically-structured segment and the hierarchically-structured segment in accordance with the ordered segment sequence of the S hierarchically-structured segments.

For example, consider a segment-ordered hierarchically-structured input data object that includes S=4 hierarchically-structured segments that are associated with the following ordered segment sequence: {S1→S2→S3→S4}. In this example, the initial hierarchically-structured segment S1 is followed by the hierarchically-structured segment S2, which is followed by the hierarchically-structured segment S3, which is in turn followed by the final hierarchically-structured segment S4. In some embodiments, given this exemplary segment-ordered hierarchically-structured input data object, the cross-segment distance positional indicator for the hierarchically-structured segment S1 with respect to the hierarchically-structured segment S3 is −2, a value which describes that the hierarchically-structured segment S1 precedes the hierarchically-structured segment S3 and that there is one hierarchically-structured segment (i.e., the hierarchically-structured segment S2) between the hierarchically-structured segment S1 and the hierarchically-structured segment S3. Furthermore, in some embodiments, given this exemplary segment-ordered hierarchically-structured input data object, the cross-segment distance positional indicator for the hierarchically-structured segment S4 with respect to the hierarchically-structured segment S3 is +1, a value which describes that the hierarchically-structured segment S4 follows the hierarchically-structured segment S3 and that there is no hierarchically-structured segments between the hierarchically-structured segment S4 and the hierarchically-structured segment S3. Moreover, in some embodiments, given this exemplary segment-ordered hierarchically-structured input data object, the cross-segment distance positional indicator for the hierarchically-structured segment S3 with respect to the hierarchically-structured segment S3 (i.e., with respect to itself) is zero.

In some embodiments, each hierarchically-structured segment of a segment-ordered hierarchically-structured input data object is itself associated with a set of ordered segment tokens associated with a per-segment token order. In some of the noted embodiments, the ordered segment tokens of a hierarchically-structured segment comprise a data value set comprising a set of data values and a metadata label set. For example, an exemplary hierarchically-structured segment may be "REF*OF*152239999~", may include the following segment tokens {REF, OF, 152239999}, and may be associated with the following per-segment token order {REF→OF→152239999}. In this example, "REF" and "OF" may be metadata labels of the exemplary hierarchically-structured segment, while "152239999" may be the sole data value of the exemplary hierarchically-structured segment. In some embodiments, because the per-segment token order defines an ordering of the segment tokens of a hierarchically-structured segment, and because the segment tokens of a hierarchically-structured segment include the metadata labels of the hierarchically-structured segment, the per-segment taken order for the hierarchically-structured segment by definition defines an ordering of metadata labels of the hierarchically-structured segment that is referred to herein as a per-segment metadata label order for the hierarchically-structured segment. For example, the exemplary hierarchically-structured segment "REF*OF*152239999~" may be associated with the following per-segment metadata label order {REF→OF}.

In some embodiments, a hierarchically-structured segment is associated with a set of metadata labels that appear in the hierarchically-structured segment known as the metadata label set for the hierarchically-structured segment. In some of the noted embodiments, the metadata label set for a hierarchically-structured segment comprise a primary metadata label and a secondary metadata label. A primary metadata label may be a metadata label of a corresponding hierarchically-structured segment that is positioned to indicate that the primary metadata label has semantic significance for the entirety of the segment tokens in the hierarchically-structured segment. In some embodiments, when the metadata label set for the hierarchically-structured segment is associated with a per-segment metadata label order that defines an ordering of the metadata labels in the noted metadata label set, the initial metadata label in the noted metadata label set as defined in accordance with the per-segment metadata label order is selected as the primary metadata label for the noted hierarchically-structured segment. For example, if an exemplary hierarchically-structured segment is associated with the per-segment metadata label order {REF→OF}, then the metadata label "REF" may be selected as the primary metadata label for the noted exemplary hierarchically-structured segment.

In some embodiments, a secondary metadata label may be a metadata label of a corresponding hierarchically-structured segment that is positioned to indicate that the primary metadata label has semantic significance for a non-holistic segment of the segment tokens in the hierarchically-structured segment. In some embodiments, when the metadata label set for the hierarchically-structured segment is associated with a per-segment metadata label order that defines an ordering of the metadata labels in the noted metadata label set, non-initial metadata labels in the noted metadata label set as defined in accordance with the per-segment metadata label order are selected as the secondary metadata labels for the noted hierarchically-structured segment. For example, if an exemplary hierarchically-structured segment is associated with the per-segment metadata label order {REF→OF}, then the metadata label "OF" may be selected as the sole secondary metadata label for the noted exemplary hierarchically-structured segment. As another example, if an exemplary hierarchically-structured segment is associated with the per-segment metadata label order {INS→Y→X-N→A→E→FT}, then the metadata labels "Y", "XN", "XN", "A", "E", and "FT" may be selected as secondary metadata labels for the noted exemplary hierarchically-structured segment.

While various embodiments of the present invention are described with reference to a hierarchically-structured segment that has a primary metadata label and a set of secondary metadata labels, a person of ordinary skill in the relevant technology will recognize that, in some embodiments, some or all of the hierarchically-structured segments of a segment-ordered hierarchically-structured input data object may only have one primary metadata label. An example of such a hierarchically-structured segment is "N4*CHICAGO*IL*60661*USA~", which is associated with only one primary metadata label "N4" but is not associated with any secondary metadata labels (as all the following segment tokens of the noted hierarchically-structured segment are data values). However, in some of the noted embodiments, even when some hierarchically-structured segments of a segment-ordered hierarchically-structured input data object are associated with only one metadata label, the underlying structural scheme/standard (e.g., EDI standard) associated with the segment-ordered hierarchically-structured input data object (e.g., EDI file) allows for defining segments that are structured in a hierarchical manner such that each segment may include a primary metadata label and a set of secondary metadata labels. An example of a hierarchically-structured segment is a line segment of an EDI file.

In some embodiments, a segment-ordered hierarchically-structured input data object is associated with an underlying structural scheme/standard that defines a metadata label schema. In some embodiments, a metadata label schema is a set of all available/defined metadata labels defined by a structural scheme/standard that may be selected to be included in hierarchically-structured segments of various segment-ordered hierarchically-structured input data objects defined in accordance with the structural scheme/standard. An example of a metadata label schema is the set of all metadata labels (aka line segment identifier labels) defined by an EDI standard. For example, the metadata label schema associated with the X12 EDI standard can be accessed at EDI Academy, *X12 Reference Identification Qualifier* (Published on Jul. 30, 2019), available online at https://ediacademy.com/blog/x12-reference-identification-qualifier. In some embodiments, a metadata label schema defines L defined/available metadata labels, where the metadata label set for each particular hierarchically-segment is then a selected subset of the L defined/available metadata labels, such as selected subset of all of the line segment identifier labels defined by an EDI standard. In some embodiments, the metadata label schema for a corpus of segment-ordered hierarchically-structured input data objects (e.g., a corpus of EDI X12 files) is generated by identifying the metadata labels occurring within the corpus using a frequency-based keyword extraction routine, such as a frequency-based keyword extraction routine that uses one or more statistical measures such as an entropy measure, a Gini index measure, and/or the like.

An operational example of a segment-ordered hierarchically-structured input data object 500, which is an EDI X12 standard file, is depicted in FIG. 5. As depicted in FIG. 5, the segment-ordered hierarchically-structured input data object 500 is associated with 16 hierarchically-structured segments (each associated with a corresponding EDI X12 line segment), such as the hierarchically-structured segment 501, the hierarchically-structured segment 502, the hierarchically-structured segment 503, the hierarchically-structured segment 504, and the hierarchically-structured segment 505.

As further depicted in FIG. 5, the positional ordering of the hierarchically-structured segments of the segment-ordered hierarchically-structured input data object 500 defines an ordered segment sequence. For example, the ordered segment sequence of segment-ordered hierarchically-structured input data object 500 defines that: (i) the hierarchically-structured segment 501 is the initial hierarchically-structured segment of the 16 hierarchically-structured segments, (ii) the hierarchically-structured segment 505 is the final hierarchically-structured segment of the 16 hierarchically-structured segments, (iii) the hierarchically-structured segment 501 precedes the hierarchically-structured segments 502-505, (iv) the hierarchically-structured segment 502 precedes the hierarchically-structured segments 503-505, (v) the hierarchically-structured segment 503 precedes the hierarchically-structured segments 504-505, and (iv) the hierarchically-structured segment 504 precedes the hierarchically-structured segment 505.

As further depicted in FIG. 5, each hierarchically-structured segment of the segment-ordered hierarchically-structured input data object 500 is associated with a set of metadata labels. For example, the hierarchically-structured segment 501 is associated with the primary metadata label "REF" but is not associated with any secondary metadata labels, the hierarchically-structured segment 502 is associated with the primary metadata label "REF" and the secondary metadata label "1L", the hierarchically-structured segment 503 is associated with the primary metadata label "HD" and the secondary metadata labels "VIS" and "EMP", the hierarchically-structured segment 504 is associated with the primary metadata label "REF" and the secondary metadata label "1L", and the hierarchically-structured segment 505 is associated with the primary metadata label "DTP" and the secondary metadata label "D8".

As described above, the ordered segment sequence of the S hierarchically-structured segments of a segment-ordered hierarchically-structured input data object enables generating the cross-segment distance positional indicator for segment pairs of the S hierarchically-structured segments. For example, the cross-segment distance positional indicator for the hierarchically-structured segment 501 with respect to the hierarchically-structured segment 503 may be −9, as the hierarchically-structured segment 501 precedes the hierarchically-structured segment 503 in accordance with the ordered segment sequence and there are eight hierarchically-structured segments between the noted two hierarchically-structured segments in accordance with the ordered segment sequence. As another example, the cross-segment distance positional indicator for the hierarchically-structured segment 502 with respect to the hierarchically-structured segment 503 may be −6, as the hierarchically-structured segment 502 precedes the hierarchically-structured segment 503 in accordance with the ordered segment sequence and there are five hierarchically-structured segments between the noted two hierarchically-structured segments in accordance with the ordered segment sequence. As yet another example, the cross-segment distance positional indicator for the hierarchically-structured segment 503 with respect to itself may be zero. As a further example, the cross-segment distance positional indicator for the hierarchically-structured segment 504 with respect to the hierarchically-structured segment 503 may be +2, as the hierarchically-structured segment 504 follows the hierarchically-structured segment 503 in accordance with the ordered segment sequence and there is one hierarchically-structured segment between the noted two hierarchically-structured segments in accordance with the ordered segment sequence. As an additional example, the cross-segment distance positional indicator for the hierarchically-structured segment 505 with respect to the hierarchically-structured segment 503 may be +6, as the hierarchically-structured segment 505 follows the hierarchically-structured segment 503 in accordance with the ordered segment sequence and there are five hierarchically-structured segments between the noted two hierarchically-structured segments in accordance with the ordered segment sequence.

Returning to FIG. 4, at step/operation 402, the predictive data analysis computing entity 106 generates a dual-positional-mode segment embedding for each hierarchically-structured segment of the segment-ordered hierarchically-structured input data object. Accordingly, in some embodiments, via performing/executing the step/operation 402, the predictive data analysis computing entity 106 generates S dual-positional-mode segment embeddings, with each dual-positional-mode segment embedding being a fixed-size representation of a corresponding hierarchically-structured segment of the S hierarchically-structured segments of the segment-ordered hierarchically-structured input data object. An operational example of a dual-positional-mode segment embedding 602 for the hierarchically-structured segment 601 is depicted in FIG. 6.

In some embodiments, a dual-positional-mode segment embedding is a fixed-size representation of a corresponding hierarchically-structured segment in a particular segment-ordered hierarchically-structured input data object that describes: (i) the primary metadata label for the corresponding hierarchically-structured segment, (ii) for each metadata label of the corresponding hierarchically-structured segment, an intra-segment positional indicator for the metadata label within the corresponding hierarchically-structured segment, and (iii) a cross-segment distance positional indicator for the corresponding hierarchically-structured segment within the particular segment-ordered hierarchically-structured input data object. For example, consider a segment-ordered hierarchically-structured input data object that is associated with an ordered segment sequence in which the hierarchically-structured segment "DTP*357*D8*20111015~" is the sixteenth hierarchically-structured segment while the hierarchically-structured segment "HD*030VISEMP~" is the tenth hierarchically-structured segment. In some embodiments, given the noted example, the dual-positional-mode segment embedding for the hierarchically-structured segment "DTP*357*D8*20111015~" may describe that: (i) the primary metadata label for the hierarchically-structured segment "DTP*357*D8*20111015~" is the metadata label "DTP", (ii) the metadata label "DTP" is the first-occurring metadata label of the hierarchically-structured segment "DTP*357*D8*20111015~" while the metadata label "D8" is the second-occurring metadata label of the hierarchically-structured segment "DTP*357*D8*20111015~", and (iii) the hierarchically-structured segment "DTP*357*D8*20111015~" has a cross-segment distance positional indicator of +6 with respect to the hierarchically-structured segment "HD*030VISEMP~". In some other embodiments, given the noted example, the dual-positional-mode segment embedding for the hierarchically-structured segment "DTP*357*D8*20111015~" may describe that: (i) the primary metadata label for the hierarchically-structured segment "DTP*357*D8*20111015~" is the metadata label "DTP", (ii) the metadata label "DTP" is the first-occurring segment token of the hierarchically-structured segment "DTP*357*D8*20111015~" while the metadata label "D8" is the third-occurring segment token of the hierarchically-structured segment "DTP*357*D8*20111015~", and (iii) the hierarchically-structured segment "DTP*357*D8*20111015~" has a cross-segment distance positional indicator of +6 with respect to the hierarchically-structured segment "HD*030VISEMP~".

In some embodiments, given a hierarchically-structured segment of a segment-ordered hierarchically-structured input data object that is associated with a metadata label set of a metadata label schema comprising L defined metadata labels, the dual-positional-mode segment embedding for the hierarchically-structured segment comprises an L+1-sized vector, where: (i) the L+1 values of the vector include a set of L values and a singular value, (ii) the L values comprise a respective label-specific value for each defined label of the L metadata labels defined by the metadata label schema, (iii) each label-specific value for a respective defined label describes whether the respective defined label occurs at all in the hierarchically-structured segment and, if so, the intra-segment positional indicator for the respective defined label, and (iv) the singular value describes a cross-segment distance positional indicator for the hierarchically-structured segment.

For example, consider an exemplary environment in which: (i) a metadata label schema defines L=4 available metadata labels L1, L2, L3, and L4, and (ii) a hierarchically-structured segment "L1*V1*L2*V2" has a cross-segment positional distance indicator +10 with respect to a reference hierarchically-structured segment in the same segment-ordered hierarchically-structured input data object. In some embodiments, given this exemplary environment, the dual-positional-mode segment embedding for the hierarchically-structured segment "L1*V1*L2*V2" may comprise a 4+1=5-sized vector [1, 2, 0, 0, +10]. In this example, the vector comprises: (i) a first value that describes that the metadata label L1 is the first metadata label of the hierarchically-structured segment "L1*V1*L2*V2", (ii) a second value that describes that the metadata label L2 is the second metadata label of the hierarchically-structured segment "L1*V1*L2*V2", (iii) a third value that describes that the metadata label L3 does not appear in (i.e., is not in the metadata label set for) the hierarchically-structured segment "L1*V1*L2*V2", (iv) a fourth value that describes that the metadata label L4 does not appear in (i.e., is not in the metadata label set for) the hierarchically-structured segment "L1*V1*L2*V2", and (v) a fifth value that describes that the hierarchically-structured segment "L1*V1*L2*V2" has the cross-segment positional distance indicator +10 with respect to the reference hierarchically-structured segment in the same segment-ordered hierarchically-structured input data object. In some embodiments, given this exemplary environment, the dual-positional-mode segment embedding for the hierarchically-structured segment "L1*V1*L2*V2" may comprise a 4+1=5-sized vector [1, 3, 0, 0, +10]. In this example, the vector comprises: (i) a first value that describes that the metadata label L1 is the first segment token of the hierarchically-structured segment "L1*V1*L2*V2", (ii) a second value that describes that the metadata label L2 is the third segment token of the hierarchically-structured segment "L1*V1*L2*V2", (iii) a third value that describes that the metadata label L3 does not appear in (i.e., is not in the metadata label set for) the hierarchically-structured segment "L1*V1*L2*V2", (iv) a fourth value that describes that the metadata label L4 does not appear in (i.e., is not in the metadata label set for) the hierarchically-structured segment "L1*V1*L2*V2", and (v) a fifth value that describes that the hierarchically-structured segment "L1*V1*L2*V2" has the cross-segment positional distance indicator +10 with respect to the reference hierarchically-structured segment in the same segment-ordered hierarchically-structured input data object.

In some embodiments, when the metadata label set for the hierarchically-structured segment is associated with a per-segment metadata label order that defines an ordering of the metadata labels in the noted metadata label set, and further when the initial metadata label in the noted metadata label set as defined in accordance with the per-segment metadata label order is selected as the primary metadata label for the noted hierarchically-structured segment, then the dual-positional-mode segment embedding for the noted hierarchically-structured segment can describe the primary metadata label for the hierarchically-structured segment by simply associating the initial metadata label in the noted metadata label set as defined in accordance with the per-segment metadata label order with a cross-segment distance positional indicator with an intra-segment positional indicator of one.

As described above, in some embodiments, the dual-positional-mode segment embedding for a particular hierarchically-structured segment describes, for each metadata label that occurs in the particular hierarchically-structured segment, an intra-segment positional indicator for the metadata label in the hierarchically-structured segment. In some embodiments, the intra-segment positional indicator for a corresponding metadata label in a corresponding hierarchically-structured segment describes a relative position of the corresponding metadata label in an ordered sequence associated with the corresponding hierarchically-structured segment. For example, in some embodiments, the intra-segment positional indicator for a corresponding metadata label in a corresponding hierarchically-structured segment describes a relative position of the corresponding metadata label in the per-segment metadata label order for the corresponding hierarchically-structured segment. In an exemplary embodiment, using this approach, the intra-segment positional indicator for the metadata label "L2" in the hierarchically-structured segment "L1*V1*L2*V2" may be two, as the metadata label "L2" is the second-occurring metadata label in the hierarchically-structured segment "L1*V1*L2*V2". As another example, in some other embodiments, the intra-segment positional indicator for a corresponding metadata label in a corresponding hierarchically-structured segment describes a relative position of the corresponding metadata label in the per-segment token order for the corresponding hierarchically-structured segment. In an exemplary embodiment, using this approach, the intra-segment positional indicator for the metadata label "L2" in the hierarchically-structured segment "L1*V1*L2*V2" may be three, as the metadata label "L2" is the second-occurring segment token in the hierarchically-structured segment "L1*V1*L2*V2". In some embodiments, using this latter intra-segment positioning computation approach, data about not just relative ordering of metadata labels, but also relative positions of occurrences of data value tokens, are captured by the resulting dual-positional-mode segment embeddings.

As further described above, in some embodiments, the dual-positional-mode segment embedding for a particular hierarchically-structured segment describes a cross-segment positional distance indicator for the particular hierarchically-structured segment. In some embodiments, given that each hierarchically-structured segment of a segment-ordered hierarchically-structured input data object having S hierarchically-structured segments has S respective cross-segment positional distance indicators (i.e., one with respect to each hierarchically-structured segment including one with respect to itself), a determination is made as to which hierarchically-structured segment of the S hierarchically-structured segments should be selected as a reference hierarchically-structured segment. In some of the noted embodiments, after selecting the reference hierarchically-structured segment, the cross-segment positional distance indicator for each hierarchically-structured segment with respect to the hierarchically-structured segment (referred to herein as the cross-segment referential distance positional indicator) is used to generate (e.g., included as part of) the dual-positional-mode segment embedding for the noted hierarchically-structured segment.

Accordingly, in some embodiments, the dual-positional-mode segment embedding for a particular hierarchically-structured segment describes a cross-segment referential distance positional indicator for the particular hierarchically-structured segment. In some embodiments, a cross-segment referential distance positional indicator describes a cross-segment distance positional indicator between a corresponding hierarchically-structured segment and a reference hierarchically-structured segment. For example, consider a segment-ordered hierarchically-structured input data object that is associated with S=4 hierarchically-structured segments characterized by the ordered segment sequence $\{S1\rightarrow S2\rightarrow S3\rightarrow S4\}$. In this example, if the reference hierarchically-structured segment is the hierarchically-structured segment S3, then: (i) the hierarchically-structured segment S1 may be associated with the cross-segment referential distance positional indicator −2, (ii) the hierarchically-structured segment S2 may be associated with the cross-segment referential distance positional indicator −1, (iii) the hierarchically-structured segment S3 may be associated with the cross-segment referential distance positional indicator 0, and (iv) the hierarchically-structured segment S4 may be associated with the cross-segment referential distance positional indicator +1.

As another example, in the operational example of FIG. 5, if hierarchically-structured segment 503 is the reference hierarchically-structured segment of the segment-ordered hierarchically-structured input data object 500, then: (i) the cross-segment referential distance positional indicator for the hierarchically-structured segment 501 may be −9, as the hierarchically-structured segment 501 precedes the hierarchically-structured segment 503 in accordance with the ordered segment sequence and there are eight hierarchically-structured segments between the noted two hierarchically-structured segments in accordance with the ordered segment sequence, (ii) the cross-segment referential distance positional indicator for the hierarchically-structured segment 502 may be −6, as the hierarchically-structured segment 502 precedes the hierarchically-structured segment 503 in accordance with the ordered segment sequence and there are five hierarchically-structured segments between the noted two hierarchically-structured segments in accordance with the ordered segment sequence, (iii) the cross-segment referential distance positional indicator for the hierarchically-structured segment 503 may be zero, (iv) the cross-segment referential distance positional indicator for the hierarchically-structured segment 504 may be +2, as the hierarchically-structured segment 504 follows the hierarchically-structured segment 503 in accordance with the ordered segment sequence and there is one hierarchically-structured segment between the noted two hierarchically-structured segments in accordance with the ordered segment sequence, (v) the cross-segment referential distance positional indicator for the hierarchically-structured segment 505 may be +6, as the hierarchically-structured segment 505 follows the hierarchically-structured segment 503 in accordance with the ordered segment sequence and there are five hierarchically-structured segments between the noted two hierarchically-structured segments in accordance with the ordered segment sequence.

As described above, in some embodiments, a dual-positional-mode segment embedding for a hierarchically-structured segment of a segment-ordered hierarchically-structured input data object is generated to reflect both a cross-segment positional indicator for the hierarchically-structured segment within a segment ordering of the segment-ordered hierarchically-structured input data object as well as intra-segment positional indicators for metadata labels of the hierarchically-structured segment within a per-segment ordering associated with the hierarchically-structured segment. This means that, by using two levels/ modes of positionality associated with the segment-ordered hierarchically-structured input data object, the dual-positional-mode segment embedding is able to reflect two independent types of positional data associated with two independent positional embedding modes (i.e., an intra-segment positional embedding mode and a cross-segment positional embedding mode). This approach increases the amount of positional data supplied to an attention-based classifier machine learning model compared to existing single-positional-model approaches that supply cross-token positional embeddings as part of initial token embeddings. By increasing the amount of positional data supplied to an attention-based classifier machine learning model compared to existing single-positional-model approaches, various embodiments of the present invention enable increasing the amount of data patterns discovered by an attention-based classifier machine learning model during each training epoch, which increases training speed of the attention-based classifier machine learning model given a constant target predictive accuracy. Accordingly, by using two levels/modes of positionality associated with a segment-ordered hierarchically-structured input data object to generate segment embeddings provided to an attention-based classifier machine learning model during training of the noted model, various embodiments of the present invention make important technical contributions to improving computational efficiency and operational reliability of the resulting attention-based classifier machine learning models.

In some embodiments, the metadata label set for the given hierarchically-structured segment is associated with a per-segment metadata label order that defines the primary metadata label for the given hierarchically-structured segment as an initial metadata label and the one or more metadata labels for the given hierarchically-structured segment as one or more initial metadata labels. In some of the noted embodiments, the dual-positional-mode segment embedding for the given hierarchically-structured segment comprises an L+1-sized vector that comprises: (i) L vector values comprising, for each metadata label in the metadata label schema, a vector value that describes whether the metadata label is in the metadata label set for the given hierarchically-structured segment and, if the metadata label is in the metadata label set for the given hierarchically-structured segment, the intra-segment positional indicator for the metadata label with respect to the given hierarchically-structured segment, and (ii) a vector value describing the cross-segment referential distance positional indicator for the given hierarchically-structured segment.

Returning to FIG. 4, at step/operation 403, the predictive data analysis computing entity 106 processes the S dual-positional-mode segment embeddings generated at step/operation 402 (i.e., for each hierarchically-structured segment of the S hierarchically-structured segments of the segment-ordered hierarchically-structured input data object, a respective dual-positional-mode segment embedding) using an attention-based classifier machine learning model to generate task-specific segment scores for the S hierarchically-structured segments with respect to the segment inference task. In some embodiments, given S hierarchically-structured segments of the segment-ordered hierarchically-structured input data object that are associated with S corresponding dual-positional-mode segment embeddings, and further given T segment inference tasks, the attention-based classifier machine learning model generates S*T task-specific segment scores, where each task-specific segment score S*T task-specific segment score: (i) is associated with a respective hierarchically-structured segment of the S hierarchically-structured segments and a respective segment inference task of the T segment inference tasks, and (ii) describes a predicted likelihood that the respective hierarchically-structured segment contains target data associated with the respective segment inference task.

In some embodiments, a segment inference task is a computational task whose successful completion/execution with respect to a particular segment-ordered hierarchically-structured input data object requires identifying, of the S hierarchically-structured segments of the particular segment-ordered hierarchically-structured input data object, which of the noted hierarchically-structured segments contain target data associated with the segment inference task. An exemplary of a segment inference task is a computational task that requires identifying which hierarchically-structured segment of a segment-ordered hierarchically-structured input data object contains health insurance policy number data associated with a corresponding employee. Another exemplary of a segment inference task is a computational task that requires identifying which hierarchically-structured segment of a segment-ordered hierarchically-structured input data object contains employment data associated with a corresponding employee.

As described above, in some embodiments, an attention-based machine learning model may be configured to generate task-specific segment scores for any number of T (e.g., one, two, more than two, and/or the like) task-specific segment scores. For example, in an exemplary embodiment in which T=1, and the one segment inference task requires identifying which hierarchically-structured segment of a segment-ordered hierarchically-structured input data object contains health insurance policy number data associated with a corresponding employee, then, for a particular hierarchically-structured segment of the segment-ordered hierarchically-structured input data object, the attention-based classifier machine learning model generates only one task-specific segment score that describes a predicted/computed likelihood that the particular hierarchically-structured segment contains health insurance policy number data associated with the corresponding employee. In some of the noted embodiments, given T=1, the hierarchically-structured segment of the segment-ordered hierarchically-structured input data object that has the highest task-specific segment score is selected as the hierarchically-structured segment that contains health insurance policy number data associated with a corresponding employee (i.e., is selected as the predicted target segment for the sole defined segment inference task). In some other of the noted embodiments, given T=1, each hierarchically-structured segment of the segment-ordered hierarchically-structured input data object that has a threshold-satisfying task-specific segment score is selected as a hierarchically-structured segment that contains health insurance policy number data associated with a corresponding employee (i.e., is selected as one predicted target segment for the sole defined segment inference task).

As another example, in an exemplary embodiment in which T=2, where a first segment inference task requires identifying which hierarchically-structured segment of a segment-ordered hierarchically-structured input data object contains health insurance policy number data associated with a corresponding employee, and a second segment inference task requires identifying which hierarchically-structured segment of the segment-ordered hierarchically-structured input data object contains employment start date data associated with the corresponding employee, then, for a particular hierarchically-structured segment of the segment-ordered hierarchically-structured input data object, the attention-based classifier machine learning model generates two task-specific segment scores: a first task-specific segment score that describes a predicted/computed likelihood that the particular hierarchically-structured segment contains health insurance policy number data associated with the corresponding employee, and a second task-specific segment score that describes a predicted/computed likelihood that the particular hierarchically-structured segment contains employment start date data associated with the corresponding employee.

In some embodiments, an attention-based classifier model is configured to: (i) receive, as input data, S dual-positional-mode segment embeddings for S hierarchically-structured segments of a segment-ordered hierarchically-structured input data object, (ii) process the S dual-positional-mode segment embeddings using an attention-based encoding layer (e.g., a bidirectional attention-based encoding layer, such as a bidirectional attention-based encoding layer that uses a Bidirectional Encoder Representations from Transformers (BERT) model) in accordance with a computed attention weight for each segment pair comprising a pair of the S hierarchically-structured segments that describes the relative significance of the hierarchically-structured segments in the pair to each other to generate, for each hierarchically-structured segment, a respective attention-based segment embedding, (iii) for each hierarchically-structured segment, process the respective attention-based segment embedding for the hierarchically-structured segment using a latent classifier layer (e.g., a fully connected neural network architecture) to generate T task-specific segment scores for the hierarchically-structured segment with respect to T defined segment inference tasks.

For example, consider a segment-ordered hierarchically-structured input data object that includes S=3 hierarchically-structured segments {S1, S2, S3} that are associated with corresponding dual-positional-mode segment embeddings {E1, E2, E3}. In some of the noted embodiments, given two segment inference tasks T1 and T2, the attention-based classifier model: (i) for S1, processes E1, E2, and E3 using the attention-based encoding layer and in accordance with attention weights for (S1, S1), (S1, S2), and (S1, S3) respectively to generate the attention-based segment embedding A1, (ii) for S2, processes E1, E2, and E3 using the attention-based encoding layer and in accordance with attention weights for (S2, S1), (S2, S2), and (S2, S3) respectively to generate the attention-based segment embedding A2, (iii) for S3, processes E1, E2, and E3 using the attention-based encoding layer and in accordance with attention weights for (S3, S1), (S3, S2), and (S3, S3) respectively to generate the attention-based segment embedding A3, (iv) for S1, processes A1 using the latent classifier layer to generate a two-sized output vector, where the first value of the two-sized output vector is a task-specific segment score describing a predicted/computed likelihood that S1 contains data associated with T1 and the second value of the two-sized output vector is a task-specific segment score describing a predicted/computed likelihood that S2 contains data associated with T2, (v) for S2, processes A2 using the latent classifier layer to generate a two-sized output vector, where the first value of the two-sized output vector is a task-specific segment score describing a predicted/computed likelihood that S2 contains data associated with T1 and the second value of the two-sized output vector is task-specific segment score describing a predicted/computed likelihood that S2 contains data associated with T2, and (vi) for S3, processes A3 using the latent classifier layer to generate a two-sized output vector, where the first value of the two-sized output vector is a task-specific segment score describing a predicted/computed likelihood that S3 contains data associated with T1 and the second value of the two-sized output vector is task-specific segment score describing a predicted/computed likelihood that S3 contains data associated with T2.

In some embodiments, an attention-based classifier model that is associated with T segment inference task is trained using a set of training data fields, where each ith training data field is associated with an ith labeled segment-ordered hierarchically-structured input data object having a set of $S_i$ labeled hierarchically-structured segments and describes: (i) training input data comprising $S_i$ respective dual-positional-mode segment embeddings for the $S_i$ labeled hierarchically-structured segments, and (ii) ground-truth output data (e.g., ground-truth output data generated based at least in part on subject matter expert data, heuristic-generated labeling data, regular-expression-generated labeling data, historically-labeled data, and/or the like) that describes, for each of the T segment inference tasks, which of the $S_i$ labeled hierarchically-structured segments contains data associated with the noted segment inference task. In some embodiments, when the attention-based classifier model comprises an attention-based encoding layer that is configured to process each dual-positional-mode segment embedding to generate, for each hierarchically-structured segment, an attention-based segment embedding and a latent classifier layer that is configured to, for each hierarchically-structured segment, generate the task-specific segment score for the hierarchically-structured segment based at least in part on the attention-based segment embedding for the hierarchically-structured segment, the two layers are trained in an end-to-end manner by backpropagating a loss model of the latent classifier layer to the attention-based encoding layer.

In some embodiments, during each inference iteration that is associated with a segment-ordered hierarchically-structured input data object that has S hierarchically-structured segments, inputs to an attention-based classifier machine learning model that is associated with (i.e., generates task-specific segment scores for) T segment inference tasks include S vectors associated with S dual-positional-mode segment embedding, while outputs of the noted attention-based classifier machine learning model comprise S output vectors each associated with a respective hierarchically-structured segment, each having the size T, and each including the T task-specific segment scores for the respective hierarchically-structured segment across the T segment inference tasks. In some embodiments, during each inference iteration that is associated with a segment-ordered hierarchically-structured input data object that has S hierarchically-structured segments, given an attention-based classifier machine learning model that is associated with (i.e., generates task-specific segment scores for) T segment inference tasks and is further associated with a domain with a metadata label schema defining L available metadata labels, inputs to the noted attention-based classifier machine learning model include S L+1-sized vectors associated with S dual-positional-mode segment embedding, while outputs of the noted attention-based classifier machine learning model comprise S output vectors each associated with a respective hierarchically-structured segment, each having the size T, and each including the T task-specific segment scores for the respective hierarchically-structured segment across the T segment inference tasks.

As described above, in some embodiments, the attention-based classifier machine learning model comprises a bidirectional attention-based encoding layer that is configured to process each dual-positional-mode segment embedding to generate, for each hierarchically-structured segment, an attention-based segment embedding, and a latent classifier layer that is configured to, for each hierarchically-structured segment, generate the task-specific segment score for the hierarchically-structured segment based at least in part on the attention-based segment embedding for the hierarchically-structured segment. An operational example of such an attention-based classifier machine learning model is the attention-based classifier machine learning model 700 is depicted in FIG. 7, in which the box 701 is a BERT-based classifier model that generates output classification scores 702 of size 3 corresponding to the two segment inference tasks 703 and a third "do nothing" class.

Returning to FIG. 4, at step/operation 404, the predictive data analysis computing entity 106 generates, for each segment inference task of the T segment inference tasks, one or more predicted target segments. In some embodiments, the predicted target segments for a particular segment inference task is a subset of the S hierarchically-structured segments of the segment-ordered hierarchically-structured input data object that are predicted to contain the target data associated with the particular segment inference task.

In some embodiments, if T=1, then, given S hierarchically-structured segments, S task-specific segment scores are generated, each task-specific segment being associated with a respective hierarchically-structured segment and the single segment inference task. In some of these embodiments, the C hierarchically-structured segments that have the C highest task-specific segment scores are selected as the predicted target segments for the single segment inference task, where C may be a predefined hyperparameter of the post-processing engine of the attention-based classifier machine learning model (e.g., C=1) and may be defined by configuration data for the noted embodiments. In other embodiments, any hierarchically-structured segment that has a threshold-satisfying task-specific segment score is selected as a predicted target segment for the single segment inference task, where the noted threshold value may be a predefined hyperparameter of the post-processing engine of the attention-based classifier machine learning model (e.g., may be 0.5 and may be satisfied if a particular task-specific segment score exceeds 0.5). In yet other embodiments, up to C hierarchically-structured segments that have the C highest task-specific segment scores and that have threshold-satisfying task-specific segment scores are selected as the predicted target segments for the single segment inference task.

In some embodiments, if T is more than one but there is no requirement that each hierarchically-structured segment be included as the predicted target segment for at most one segment inference task, then, regardless of the number of segment inference tasks, the predicted target segments for each segment inference task may be determined independent of the predicted target segments for the other segment inference tasks. For example, consider an exemplary embodiment in which the hierarchically-structured segment having the highest task-specific segment score with respect to a given segment inference task is selected as the predicted target segment for the given segment inference task, but there are no requirements that the predicted target segments for various segment inference tasks be different. In this example, if S=2 hierarchically-structured segments of a segment-ordered hierarchically-structured input data object include S1 and S2, and if T=2 segment inference tasks include T1 and T2, and if the task-specific segment score for S1 and T1 is 0.9, the task-specific segment score for S1 and T2 is 0.8, the task-specific segment score for S2 and T1 is 0.2, the task-specific segment score for S2 and T2 is 0.5, then S1 is selected as both the predicted target segment for T1 and the predicted target segment T2.

In some embodiments, if T is more than one but there is a requirement that each hierarchically-structured segment be included as the predicted target segment for at most one segment inference task, then techniques may be utilized to ensure that the predicted target segment sets are disjoint across the two or more segment inference tasks. FIG. 8 provides a flowchart diagram of an example process 800 for generating the predicted target segment for a first segment inference task of two segment inference tasks given a requirement that each segment inference task be allocated a single distinct predicted target segment from S hierarchically-structured segments of a segment-ordered hierarchically-structured input data object. Although the exemplary embodiment described in FIG. 8 is in an operational environment with two segment inference tasks where each segment inference task is allocated (i.e., predicted to have target data in) only one hierarchically-structured segment of a particular segment-ordered hierarchically-structured input data object, a person of ordinary skill in the relevant technology will recognize that the disclosed techniques can be extended to embodiments in which task-specific segment scores are generated for three or more segment inference tasks and/or embodiments in which each segment inference task is allocated (i.e., predicted to have target data in) more than one hierarchically-structured segment of a particular segment-ordered hierarchically-structured input data object.

The process 800 that is depicted in FIG. 8 begins at step/operation 801 when the predictive data analysis computing entity 106 selects, for each segment inference task, the hierarchically-structured segment having the highest task-specific segment score with respect to the segment inference as a candidate target segment for the segment inference task. In other words, the predictive data analysis computing entity 106: (i) generates the hierarchically-structured segment having the highest task-specific segment score with respect to the first segment inference as the first candidate target segment for the first segment inference task, and (ii) generates the hierarchically-structured segment having the highest task-specific segment score with respect to the second segment inference as the first candidate target segment for the first segment inference task. For example, if S=2 hierarchically-structured segments of a segment-ordered hierarchically-structured input data object include S1 and S2, and if T=2 segment inference tasks include the first segment inference task T1 and the segment inference task T2, and if the task-specific segment score for S1 and T1 is 0.9, the task-specific segment score for S1 and T2 is 0.8, the task-specific segment score for S2 and T1 is 0.2, the task-specific segment score for S2 and T2 is 0.5, then S1 is selected as both the first candidate target segment for T1 and the second candidate target segment T2.

At step/operation 802, the predictive data analysis computing entity 106 determines whether the first candidate target segment for the first segment inference task is the same as the second candidate target segment for the second segment inference task. At step/operation 803, in response to determining that the first candidate target segment for the first segment inference task is not the same as the second candidate target segment for the second segment inference task, then predictive data analysis computing entity 106 selects the first candidate target segment as the predicted target segment for the first segment inference task and selects the second candidate target segment as the predicted target segment for the second segment inference task, as this assignment satisfies the distinctness requirement.

However, in response to determining that the first candidate target segment for the first segment inference task is the same as the second candidate target segment for the second segment inference task, at step/operation 804: (i) the predictive data analysis computing entity 106 assigns the candidate target segment as the predicted target segment for a more-correlated segment inference task whose task-specific target segment with respect to the candidate target segment is higher than the task-specific segment score for the candidate target segment with respect to the other, less-correlated task-specific target segment, and (ii) the predictive data analysis computing entity 106 assigns, to the less-correlated segment inference task, the hierarchically-structured segment whose task-specific segment score with respect to the less-correlated segment inference task is the second-highest of the task-specific segment scores for the less-correlated segment inference task.

For example, if S=2 hierarchically-structured segments of a segment-ordered hierarchically-structured input data object include S1 and S2, and if T=2 segment inference tasks include the first segment inference task T1 and the segment inference task T2, and if the task-specific segment score for S1 and T1 is 0.9, the task-specific segment score for S1 and T2 is 0.8, the task-specific segment score for S2 and T1 is 0.2, the task-specific segment score for S2 and T2 is 0.5, then S1 is selected as both the first candidate target segment for T1 and the second candidate target segment T2. In some of the noted embodiments, because S1 is selected as both the first candidate target segment for T1 and the second candidate target segment T2, since the task-specific segment score for S1 and T1 is 0.9, which is bigger than the task-specific segment score for S1 and T2 is 0.8, then S1 is chosen as the predicted target segment for T1, while S2 is selected as the predicted target segment for T2 because it has the second-highest task-specific segment score for T2.

In some embodiments, given two segment inference tasks comprising a first segment inference task and a second segment inference task, the attention-based classifier machine learning model is configured to generate 2*S task-specific segment scores each associated with a corresponding hierarchically-structured segment and a corresponding segment inference task. In some embodiments, generating the predicted target segment for the first segment inference task comprises: for each segment inference task, selecting the hierarchically-structured segment having the highest task-specific segment score with respect to the segment inference as a candidate target segment; and generating the predicted target segment based at least in part on whether the candidate target segment for the first segment inference task and the candidate target segment for the second segment inference task are identical. In some of the noted embodiments, generating the predicted target segment for the first segment inference task further comprises: in response to determining that the candidate target segment for the first segment inference task and the candidate target segment for the second segment inference task are not identical, and further in response to determining that the highest task-specific segment score for the first segment inference task satisfies a threshold segment score that is determined based at least in part on the highest task-specific segment score for the first segment inference task, adopting the candidate target segment as the predicted target segment for the first segment inference task. In some embodiments, generating the predicted target segment for the first segment inference task further comprises: in response to determining that the candidate target segment for the first segment inference task and the candidate target segment for the second segment inference task are not identical, and further in response to determining that the highest task-specific segment score for the first segment inference task satisfies a threshold segment score that is determined based at least in part on the highest task-specific segment score for the first segment inference task, adopting the hierarchically-structured segment having the second-highest task-specific segment score with respect to the first segment inference task as the predicted target segment for the segment task. In some of the noted embodiments, generating the predicted target segment for the first segment inference task further comprises, in response to determining that the candidate target segment for the first segment inference task and the candidate target segment for the second segment inference task are not identical, adopting the candidate target segment as the predicted target segment for the first segment inference task.

Returning to FIG. 4, at step/operation 405, the predictive data analysis computing entity 106 performs one or more prediction-based actions based at least in part on the predicted target segment(s) for each segment inference task. In some embodiments, performing the one or more prediction-based actions for each segment inference task comprises generating display data for a prediction output user interface that displays the predicted target segment(s) for each segment inference task. An operational example of such a prediction output user interface 900 is depicted in FIG. 9, which displays the predicted target segment 901 for a first segment inference task that requires identifying which hierarchically-structured segment of a segment-ordered hierarchically-structured input data object contains health insurance policy number data associated with a corresponding employee 903, as well as the predicted target segment 902 for a second segment inference task that requires identifying which hierarchically-structured segment of the segment-ordered hierarchically-structured input data object contains employment start date data associated with the corresponding employee 903.

Examples of prediction-based actions include performing operational load balancing operations for one or more post-prediction systems for a particular segment inference ask by using predicted target segments to set the number of allowed computing entities used by the noted post-prediction systems. For example, in some embodiments, a predictive data analysis computing entity determines D target segment indicators for D hierarchically-structured segments based at least in part on the D task-specific segment scores for the D hierarchically-structured segments. Then, the count of hierarchically-structured segments that are associated with an affirmative target segment indicator, along with a resource utilization ratio for each hierarchically-structured segment, can be used to predict a predicted number of computing entities needed to perform post-prediction processing operations (e.g., automated investigation operations) with respect to the D hierarchically-structured segments. For example, in some embodiments, the number of computing entities needed to perform post-prediction processing operations (e.g., automated investigation operations) with respect to D hierarchically-structured segments can be determined based at least in part on the output of the equation: R=

$$\mathrm{ceil}\left(\sum_{k}^{k=K} ur_k\right),$$

where R is the predicted number of computing entities needed to perform post-prediction processing operations with respect to the D hierarchically-structured segment, ceil(.) is a ceiling function that returns the closest integer that is greater than or equal to the value provided as the input parameter of the ceiling function, k is an index variable that iterates over K hierarchically-structured segments among the D hierarchically-structured segments that are associated with affirmative classifications, and $ur_k$ is the estimated resource utilization ratio for a kth hierarchically-structured segment that may be determined based at least in part on a count of utterances/tokens/words in the kth hierarchically-structured segment. In some embodiments, once R is generated, the predictive data analysis computing entity can use R to perform operational load balancing for a server system that is configured to perform post-prediction processing operations (e.g., automated investigation operations) with respect to D hierarchically-structured segments. This may be done by allocating computing entities to the post-prediction processing operations if the number of currently allocated computing entities is below R, and deallocating currently allocated computing entities if the number of currently allocated computing entities is above R.

Accordingly, as described above, various embodiments of the present invention make important technical contributions to improving computational efficiency and operational reliability of training attention-based classifier machine learning models. As described herein, in some embodiments, a dual-positional-mode segment embedding for a hierarchically-structured segment of a segment-ordered hierarchically-structured input data object is generated to reflect both a cross-segment positional indicator for the hierarchically-structured segment within a segment ordering of the segment-ordered hierarchically-structured input data object as well as intra-segment positional indicators for metadata labels of the hierarchically-structured segment within a per-segment ordering associated with the hierarchically-structured segment. This means that, by using two levels/modes of positionality associated with the segment-ordered hierarchically-structured input data object, the dual-positional-mode segment embedding is able to reflect two independent types of positional data associated with two independent positional embedding modes (i.e., an intra-segment positional embedding mode and a cross-segment positional embedding mode). This approach increases the amount of positional data supplied to an attention-based classifier machine learning model compared to existing single-positional-model approaches that supply cross-token positional embeddings as part of initial token embeddings. By increasing the amount of positional data supplied to an attention-based classifier machine learning model compared to existing single-positional-model approaches, various embodiments of the present invention enable increasing the amount of data patterns discovered by an attention-based classifier machine learning model during each training epoch, which increases training speed of the attention-based classifier machine learning model given a constant target predictive accuracy. Accordingly, by using two levels/modes of positionality associated with a segment-ordered hierarchically-structured input data object to generate segment embeddings provided to an attention-based classifier machine learning model during training of the noted model, various embodiments of the present invention make important technical contributions to improving computational efficiency and operational reliability of the resulting attention-based classifier machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

identifying, by one or more processors, a segment-ordered hierarchically-structured input data object, wherein: (i) the segment-ordered hierarchically-structured input data object comprises an ordered segment sequence of a plurality of hierarchically-structured segments, (ii) a hierarchically-structured segment of the plurality of hierarchically-structured segments comprises a metadata label set that is selected from a metadata label schema comprising a plurality of metadata labels, (iii) the metadata label set for the hierarchically-structured segment comprises a primary metadata label and a secondary metadata label, and (iv) the plurality of hierarchically-structured segments comprises a reference hierarchically-structured segment;

generating, by the one or more processors, a plurality of dual-positional-mode segment embeddings corresponding to the plurality of hierarchically-structured segments, wherein a dual-positional-mode segment embedding of the plurality of dual-positional-mode segment embeddings describes: (i) an intra-segment positional indicator for a metadata label, of the plurality of metadata labels, associated with the hierarchically-structured segment, (ii) the primary metadata label for the hierarchically-structured segment, and (iii) a cross-segment referential distance positional indicator for the hierarchically-structured segment with respect to the reference hierarchically-structured segment;

inputting, by the one or more processors, the plurality of dual-positional-mode segment embeddings to an attention-based classifier machine learning model to generate, during a plurality of training epochs and based at least in part on a segment inference task, a plurality of task-specific segment scores corresponding to the plurality of dual-positional-mode segment embeddings, wherein an amount of data patterns discovered by the attention-based classifier machine learning model is increased during a training epoch of the plurality of training epochs by providing two levels of positionality associated with the segment-ordered hierarchically-structured input data object to the attention-based classifier machine learning model;

generating, by the one or more processors, a predicted target segment based at least in part on the plurality of task-specific segment scores; and initiating, by the one or more processors, performance of one or more prediction-based actions based at least in part on the predicted target segment.

2. The computer-implemented method of claim 1, wherein:

the segment inference task is selected from two segment inference tasks comprising the segment inference task and a second segment inference task, and the attention-based classifier machine learning model is configured to generate a number of task-specific segment scores equivalent to double a number of the plurality of hierarchically-structured segments, a task-specific segment score, of the plurality of task-specific segment scores, is associated with the hierarchically-structured segment and a corresponding segment inference task, and the task-specific segment score describes a predicted likelihood that the hierarchically-structured segment contains target data associated with the corresponding segment inference task.

3. The computer-implemented method of claim 2, wherein generating the predicted target segment for comprises:

selecting the hierarchically-structured segment having a highest task-specific segment score with respect to the segment inference task as a candidate target segment; and generating the predicted target segment based at least in part on whether the candidate target segment for the segment inference task and the candidate target segment for the second segment inference task are identical.

4. The computer-implemented method of claim 3, wherein generating the predicted target segment further comprises:

in response to determining (i) the candidate target segment for the segment inference task and the candidate target segment for the second segment inference task are not identical and (ii) the highest task-specific segment score for the segment inference task satisfies a threshold segment score that is determined based at least in part on the highest task-specific segment score for the segment inference task, adopting the candidate target segment as the predicted target segment for the segment inference task.

5. The computer-implemented method of claim 3, wherein generating the predicted target segment further comprises:

in response to determining (i) the candidate target segment for the segment inference task and the candidate target segment for the second segment inference task are not identical and (ii) the highest task-specific segment score for the segment inference task satisfies a threshold segment score that is determined based at least in part on the highest task-specific segment score for the segment inference task, adopting the hierarchically-structured segment having a second-highest task-specific segment score with respect to the segment inference task as the predicted target segment for the segment inference task.

6. The computer-implemented method of claim 3, wherein generating the predicted target segment further comprises:

in response to determining that the candidate target segment for the segment inference task and the candidate target segment for the second segment inference task are not identical, adopting the candidate target segment as the predicted target segment for the segment inference task.

7. The computer-implemented method of claim 1, wherein:

the metadata label set for the hierarchically-structured segment is associated with a per-segment metadata label order that defines the primary metadata label for the hierarchically-structured segment as an initial metadata label and the secondary metadata label for the hierarchically-structured segment as a non-initial metadata label, and the dual-positional-mode segment embedding for the given hierarchically-structured segment comprises a vector of a size equivalent to one more than a number of the plurality of metadata labels that comprises: (i) a plurality of vector values corresponding to the plurality of metadata labels, a vector value of the plurality of vector values describing whether the metadata label is in the metadata label set for the hierarchically-structured segment, (ii) the intra-segment positional indicator for the metadata label with respect to the hierarchically-structured segment, and (iii) a vector value describing the cross-segment referential distance positional indicator for the hierarchically-structured segment.

8. The computer-implemented method of claim 1, wherein:

(i) the attention-based classifier machine learning model comprises (a) a bidirectional attention-based encoding layer configured to process the plurality of dual-positional-mode segment embeddings to generate a plurality of attention-based segment embeddings, and (b) a latent classifier layer configured to process the plurality of hierarchically-structured segments to generate the plurality of task-specific segment scores based at least in part on the plurality of attention-based segment embeddings, and (ii) the bidirectional attention-based encoding layer and the latent classifier layer are trained in an end-to-end manner by backpropagating a loss model of the latent classifier layer to the bidirectional attention-based encoding layer.

9. A system comprising:

one or more processors; and at least one memory storing processor-executable instructions that, when executed by the one or more processors, cause the one or more processors to:

identify a segment-ordered hierarchically-structured input data object, wherein: (i) the segment-ordered hierarchically-structured input data object comprises an ordered segment sequence of a plurality of hierarchically-structured segments, (ii) a hierarchically-structured segment of the plurality of hierarchically-structured segments comprises a metadata label set that is selected from a metadata label schema comprising a plurality of metadata labels, (iii) the metadata label set for the hierarchically-structured segment comprises a primary metadata label and a secondary metadata label, and (iv) the plurality of hierarchically-structured segments comprises a reference hierarchically-structured segment;

generate a plurality of dual-positional-mode segment embeddings corresponding to the plurality of hierarchically-structured segments, wherein a dual-positional-mode segment embedding of the plurality of dual-positional-mode segment embeddings describes: (i) an intra-segment positional indicator for a metadata label, of the plurality of metadata labels, associated with the hierarchically-structured segment, (ii) the primary metadata label for the hierarchically-structured segment, and (iii) a cross-segment referential distance positional indicator for the hierarchically-structured segment with respect to the reference hierarchically-structured segment;

input the plurality of dual-positional-mode segment embeddings to an attention-based classifier machine learning model to generate, during a plurality of training epochs and based at least in part on a segment inference task, a plurality of task-specific segment scores corresponding to the plurality of dual-positional-mode segment embeddings, wherein an amount of data patterns discovered by the attention-based classifier machine learning model is increased during a training epoch of the plurality of training epochs by providing two levels of positionality associated with the segment-ordered hierarchically-structured input data object to the attention-based classifier machine learning model;

generate a predicted target segment based at least in part on the plurality of task-specific segment scores; and initiate performance of one or more prediction-based actions based at least in part on the predicted target segment.

10. The system of claim 9, wherein:

the segment inference task is selected from two segment inference tasks comprising the segment inference task and a second segment inference task, and the attention-based classifier machine learning model is configured to generate a number of task-specific segment scores equivalent to double a number of the plurality of hierarchically-structured segments, a task-specific segment score, of the plurality of task-specific segment scores, is associated with a corresponding hierarchically-structured segment and a corresponding segment inference task, and the task-specific segment score describes a predicted likelihood that the hierarchically-structured segment contains target data associated with the corresponding segment inference task.

11. The system of claim 10, wherein, to generate the predicted target segment, the processor-executable instructions further cause the one or more processors to:

select the hierarchically-structured segment having a highest task-specific segment score with respect to the segment inference task as a candidate target segment; and generate the predicted target segment based at least in part on whether the candidate target segment for the segment inference task and the candidate target segment for the second segment inference task are identical.

12. The system of claim 11, wherein, to generate the predicted target segment, the processor-executable instructions further cause the one or more processors to:

in response to a determination that (i) the candidate target segment for the segment inference task and the candidate target segment for the second segment inference task are not identical and (ii) the highest task-specific segment score for the segment inference task satisfies a threshold segment score that is determined based at least in part on the highest task-specific segment score for the segment inference task, adopt the candidate target segment as the predicted target segment for the segment inference task.

13. The system of claim 11, wherein, to generate the predicted target segment, the processor-executable instructions further cause the one or more processors to:

in response to a determination that (i) the candidate target segment for the segment inference task and the candidate target segment for the second segment inference task are not identical and (ii) the highest task-specific segment score for the segment inference task satisfies a threshold segment score that is determined based at least in part on the highest task-specific segment score for the segment inference task, adopt the hierarchically-structured segment having a second-highest task-specific segment score with respect to the segment inference task as the predicted target segment for the segment inference task.

14. The system of claim 11, wherein, to generate the predicted target segment, the processor-executable instructions further cause the one or more processors to:

in response to a determination that the candidate target segment for the segment inference task and the candidate target segment for the second segment inference task are not identical, adopt the candidate target segment as the predicted target segment for the segment inference task.

15. The system of claim 9, wherein:

the metadata label set for the hierarchically-structured segment is associated with a per-segment metadata label order that defines the primary metadata label for the hierarchically-structured segment as an initial metadata label and the secondary metadata label for the hierarchically-structured segment as a non-initial metadata label, and the dual-positional-mode segment embedding for the hierarchically-structured segment comprises a vector of a size equivalent to one more than a number of the plurality of metadata labels that comprises: (i) a plurality of vector values corresponding to the plurality of metadata labels, a vector value of the plurality of vector values describing whether the metadata label is in the metadata label set for the hierarchically-structured segment, (ii) the intra-segment positional indicator for the metadata label with respect to the hierarchically-structured segment, and (iii) a vector value describing the cross-segment referential distance positional indicator for the hierarchically-structured segment.

16. The system of claim 9, wherein:

(i) the attention-based classifier machine learning model comprises (a) a bidirectional attention-based encoding layer configured to process the plurality of dual-positional-mode segment embeddings to generate a plurality of attention-based segment embeddings, and (b) a latent classifier layer configured to process the plurality of hierarchically-structured segments to generate the plurality of task-specific segment scores based at least in part on the plurality of attention-based segment embeddings, and (ii) the bidirectional attention-based encoding layer and the latent classifier layer are trained in an end-to-end manner by backpropagating a loss model of the latent classifier layer to the bidirectional attention-based encoding layer.

17. One or more non-transitory computer-readable storage media including instructions that, when executed by one or more processors, cause the one or more processors to:

identify a segment-ordered hierarchically-structured input data object, wherein: (i) the segment-ordered hierarchically-structured input data object comprises an ordered segment sequence of a plurality of hierarchically-structured segments, (ii) a hierarchically-structured segment of the plurality of hierarchically-structured segments comprises a metadata label set that is selected from a metadata label schema comprising a plurality of metadata labels, (iii) the metadata label set for the hierarchically-structured segment comprises a primary metadata label and a secondary metadata label, and (iv) the plurality of hierarchically-structured segments comprises a reference hierarchically-structured segment;

generate a plurality of dual-positional-mode segment embeddings corresponding to the plurality of hierarchically-structured segments, wherein a dual-positional-mode segment embedding of the plurality of dual-positional-mode segment embeddings describes: (i) an intra-segment positional indicator for a metadata label, of the plurality of metadata labels, associated with the hierarchically-structured segment, (ii) the primary metadata label for the hierarchically-structured segment, and (iii) a cross-segment referential distance positional indicator for the hierarchically-structured segment with respect to the reference hierarchically-structured segment;

input the plurality of dual-positional-mode segment embeddings to an attention-based classifier machine learning model to generate, during a plurality of training epochs and based at least in part on a segment inference task, a plurality of task-specific segment scores corresponding to the plurality of dual-positional-mode segment embeddings, wherein an amount of data patterns discovered by the attention-based classifier machine learning model is increased during a training epoch of the plurality of training epochs by providing two levels of positionality associated with the segment-ordered hierarchically-structured input data object to the attention-based classifier machine learning model;

generate a predicted target segment based at least in part on the plurality of task-specific segment scores; and initiate performance of one or more prediction-based actions based at least in part on the predicted target segment.

18. The one or more non-transitory computer-readable storage media of claim 17, wherein:

the segment inference task is selected from two segment inference tasks comprising the segment inference task and a second segment inference task, and the attention-based classifier machine learning model is configured to generate a number of task-specific segment scores equivalent to double a number of the plurality of hierarchically-structured segments, a task-specific segment score, of the plurality of task-specific segment scores, is associated with a corresponding hierarchically-structured segment and a corresponding segment inference task, and the task-specific segment score describes a predicted likelihood that the hierarchically-structured segment contains target data associated with the corresponding segment inference task.

19. The one or more non-transitory computer-readable storage media of claim 18, wherein, to generate the predicted target segment, the instructions further cause the one or more processors to:

select the hierarchically-structured segment having a highest task-specific segment score with respect to the segment inference task as a candidate target segment; and generate the predicted target segment based at least in part on whether the candidate target segment for the segment inference task and the candidate target segment for the second segment inference task are identical.

20. The one or more non-transitory computer-readable storage media of claim 17, wherein:

the metadata label set for the hierarchically-structured segment is associated with a per-segment metadata label order that defines the primary metadata label for the hierarchically-structured segment as an initial metadata label and the secondary metadata label for the hierarchically-structured segment as a non-initial metadata label, and the dual-positional-mode segment embedding for the hierarchically-structured segment comprises a vector of a size equivalent to one more than a number of the plurality of metadata labels that comprises: (i) a plurality of vector values corresponding to the plurality of metadata labels, a vector value of the plurality of vector values describing whether the metadata label is in the metadata label set for the hierarchically-structured segment, (ii) the intra-segment positional indicator for the metadata label with respect to the hierarchically-structured segment, and (iii) a vector value describing the cross-segment referential distance positional indicator for the hierarchically-structured segment.

* * * * *